United States Patent
Pertsel et al.

(10) Patent No.: US 10,953,850 B1
(45) Date of Patent: Mar. 23, 2021

(54) SEATBELT DETECTION USING COMPUTER VISION

(71) Applicant: Ambarella International LP, Santa Clara, CA (US)

(72) Inventors: Shimon Pertsel, Mountain View, CA (US); Patrick Martin, Rochester, MI (US)

(73) Assignee: Ambarella International LP, Santa Clara, CA (US)

( * ) Notice: Subject to any disclaimer, the term of this patent is extended or adjusted under 35 U.S.C. 154(b) by 326 days.

(21) Appl. No.: 16/001,242

(22) Filed: Jun. 6, 2018

Related U.S. Application Data

(63) Continuation-in-part of application No. 15/965,891, filed on Apr. 28, 2018.

(Continued)

(51) Int. Cl.
| | | |
|---|---|---|
| *B60K 28/00* | (2006.01) | |
| *B60R 21/01* | (2006.01) | |
| *G06K 9/66* | (2006.01) | |
| *G06K 9/60* | (2006.01) | |
| *G05D 1/00* | (2006.01) | |
| *B60R 21/02* | (2006.01) | |
| *B60N 2/50* | (2006.01) | |

(Continued)

(52) U.S. Cl.
CPC ........ *B60R 22/48* (2013.01); *B60R 21/01538* (2014.10); *B60R 21/01544* (2014.10); *G06K 9/00838* (2013.01); *G06N 3/02* (2013.01); *G06N 5/046* (2013.01); *G06N 20/00* (2019.01); *B60R 2021/01034* (2013.01); *B60R 2021/01272* (2013.01); *B60R 2022/4808* (2013.01)

(58) Field of Classification Search
None
See application file for complete search history.

(56) References Cited

U.S. PATENT DOCUMENTS

| | | | | |
|---|---|---|---|---|
| 7,164,117 B2 * | 1/2007 | Breed | ............... | B60R 21/01516 250/208.1 |
| 7,609,893 B2 * | 10/2009 | Luo | ..................... | G06K 9/00369 382/224 |

(Continued)

OTHER PUBLICATIONS

Ren, Shaoqing, et al., "Faster R-CNN: Towards Real-Time Object Detection With Region Proposal Networks", arXiv preprint arXiv:1506.01497v3 [cs.CV], Jan. 6, 2016, 14 pages.

(Continued)

*Primary Examiner* — Adam D Tissot
(74) *Attorney, Agent, or Firm* — Christopher P. Maiorana, PC

(57) ABSTRACT

An apparatus includes a capture device and a processor. The capture device may be configured to generate a plurality of video frames corresponding to an interior view of a vehicle. The processor may be configured to perform operations to detect objects in the video frames, detect (a) occupants of the vehicle and (b) seats of the vehicle based on the objects detected in the video frames, determine a status of a seatbelt for each of the occupants and select a reaction based on (a) a state of the seatbelt and (b) characteristics of the occupants. The reaction may be selected to encourage proper usage of the seatbelt based on the characteristics of the occupants. The characteristics may be determined by performing the operations on each of the occupants.

20 Claims, 14 Drawing Sheets

Related U.S. Application Data

(60) Provisional application No. 62/653,008, filed on Apr. 5, 2018.

(51) Int. Cl.

| | | |
|---|---|---|
| *B60N 2/26* | (2006.01) | |
| *B60R 22/48* | (2006.01) | |
| *B60R 21/015* | (2006.01) | |
| *G06K 9/00* | (2006.01) | |
| *G06N 3/02* | (2006.01) | |
| *G06N 5/04* | (2006.01) | |
| *G06N 20/00* | (2019.01) | |

(56) References Cited

U.S. PATENT DOCUMENTS

| | | | | |
|---|---|---|---|---|
| 9,135,420 B2* | 9/2015 | Felkins | ............ | G06F 21/32 |
| 2003/0154138 A1* | 8/2003 | Phillips | ............ | H04L 63/0861 |
| | | | | 705/26.1 |
| 2004/0024507 A1* | 2/2004 | Hein | ............ | B60R 21/01536 |
| | | | | 701/45 |
| 2007/0289799 A1* | 12/2007 | Aoki | ............ | G06K 9/00201 |
| | | | | 180/271 |
| 2009/0027188 A1* | 1/2009 | Saban | ............ | B60N 2/002 |
| | | | | 340/521 |
| 2012/0086249 A1* | 4/2012 | Hotary | ............ | B60N 2/838 |
| | | | | 297/284.3 |
| 2015/0232061 A1* | 8/2015 | Cuddihy | ............ | B60R 16/037 |
| | | | | 701/45 |
| 2017/0129436 A1* | 5/2017 | Chen | ............ | H04N 7/183 |
| 2018/0225971 A1* | 8/2018 | Foltin | ............ | B60T 7/22 |
| 2018/0361984 A1* | 12/2018 | Lin | ............ | B60N 2/002 |
| 2019/0225232 A1* | 7/2019 | Blau | ............ | B60W 50/0098 |

OTHER PUBLICATIONS

Girshick, Ross, "Fast R-CNN", arXiv: 150408083v2 [cs.CV], Sep. 27, 2015, 9 pages.

Dai, Jifeng et al., "Instance-Aware Semantic Segmentation Via Multi-Task Network Cascades", IEEE Conference on Computer Vision and Pattern Recognition (CVPR), 2016, pp. 3150-3158.

Ujjwalkarn, "An intuitive Explanation of Convolutional Neural Networks", https://ujjwalkarn.me/2016/08/11/intuitive-explanation-convnets/, The Data Science Blog, Aug. 11, 2016, 16 pages.

Daniel Smilkov et al., "A Neural Network Playground", http://playground.tensorflow.org, Mar. 10, 2016, 2 pages.

* cited by examiner

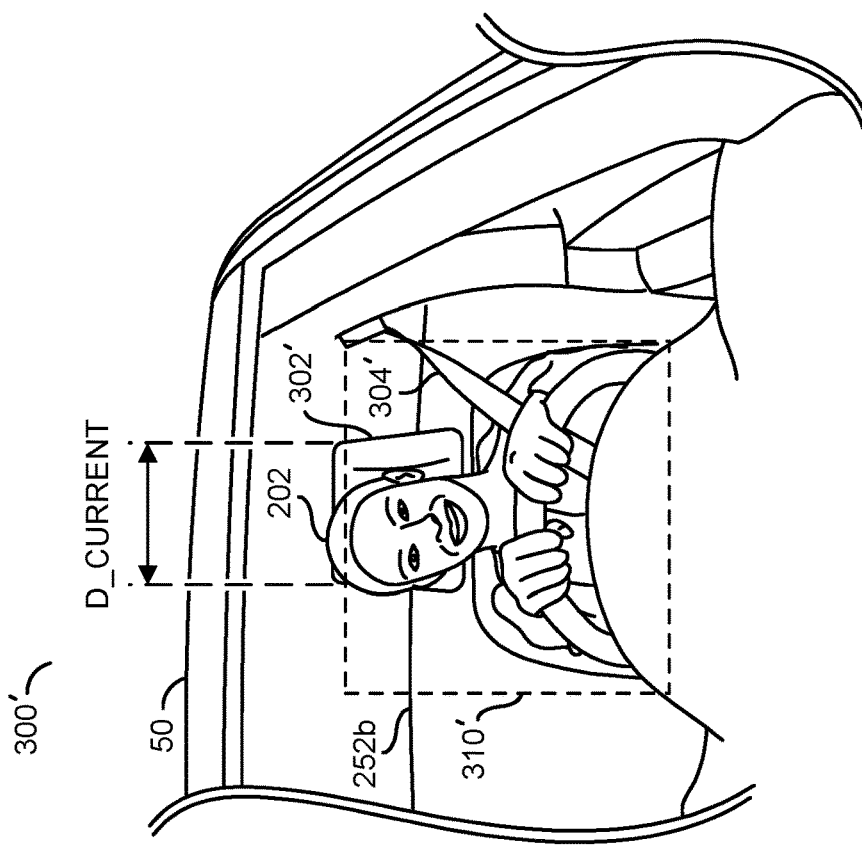
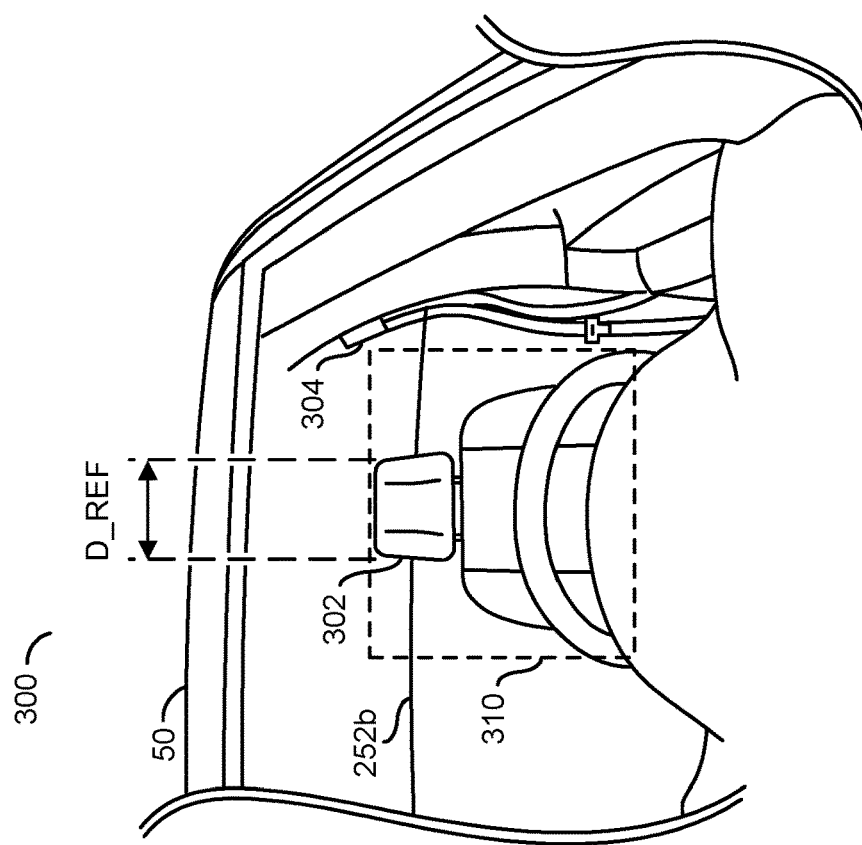
FIG. 4

SEATBELT DETECTION USING COMPUTER VISION

This application relates to U.S. Ser. No. 15/965,891, filed Apr. 28, 2018, which relates to U.S. Provisional Application No. 62/653,008, filed Apr. 5, 2018. Each of the mentioned applications are hereby incorporated by reference in its entirety.

FIELD OF THE INVENTION

The invention relates to computer vision generally and, more particularly, to a method and/or apparatus for implementing seatbelt detection using computer vision.

BACKGROUND

Seatbelts save lives. However, many vehicle occupants do not want to wear a seatbelt, forget to wear a seatbelt and/or wear a seatbelt improperly. An improperly worn seatbelt (i.e., strapped under the arm instead of over the shoulder) can also cause significant harm to occupants. During an impact scenario, or when a driver brakes rapidly, properly worn seatbelts can mitigate harm to the occupants.

Some car seats are designed to make an assumption about whether the seat is occupied by sensing pressure. Combined with sensors that detect whether a seatbelt is connected, some vehicles provide audio warnings when the assumption is made that a seat is occupied and the belt is disconnected. However, audio warnings can be a nuisance to drivers when the assumptions made are wrong (i.e., the seat is occupied by a grocery bag that the pressure sensors assumes is a person). Without knowledge of the occupants within the vehicle, proper seatbelt use cannot be accurately detected. The assumptions made by traditional occupant detection sensors do not account for various traits and/or conditions of different occupants. Furthermore, without knowledge of the occupants of the vehicle, methods to encourage proper seatbelt use are limited to simple warnings.

It would be desirable to implement seatbelt detection using computer vision.

SUMMARY

The invention concerns an apparatus comprising a capture device and a processor. The capture device may be configured to generate a plurality of video frames corresponding to an interior view of a vehicle. The processor may be configured to perform operations to detect objects in the video frames, detect (a) occupants of the vehicle and (b) seats of the vehicle based on the objects detected in the video frames, determine a status of a seatbelt for each of the occupants and select a reaction based on (a) a state of the seatbelt and (b) characteristics of the occupants. The reaction may be selected to encourage proper usage of the seatbelt based on the characteristics of the occupants. The characteristics may be determined by performing the operations on each of the occupants.

BRIEF DESCRIPTION OF THE FIGURES

Embodiments of the invention will be apparent from the following detailed description and the appended claims and drawings in which:

FIG. 4 is a diagram illustrating an object comparison between a reference video frame and a captured video frame;

DETAILED DESCRIPTION OF THE EMBODIMENTS

Embodiments of the present invention include providing seatbelt detection using computer vision that may (i) utilize interior cameras of a vehicle, (ii) encourage proper seatbelt usage, (iii) automatically adjust seatbelts, (iv) enhance detection and/or warnings about improper seatbelt usage, (v) use computer vision to detect movement patterns, (vi) determine characteristics of occupants of a vehicle, (vii) implement fleet learning to train a convolutional neural network, (viii) utilize computer vision with sensor fusion and/or (ix) be implemented as one or more integrated circuits.

Embodiments of the present invention may utilize interior cameras, exterior cameras and communication systems of vehicles (e.g., 3G, 4G, LTE, 5G, etc.). The present invention may implement computer vision to determine information about the interior and/or exterior of a vehicle. Using computer vision, embodiments of the present invention may classify and/or determine characteristics of objects in a vehicle (e.g., occupants, seats and/or seatbelts). In an example of a vehicle that does not have all the seatbelts connected, if some of the seats are determined to be unoccupied then seatbelt warnings may be suppressed. In another example, if the computer vision determines that one or more of the seatbelts are not being worn properly, adjustments may be made to the seatbelt automatically. By using computer vision to determine and/or understand the characteristics of each occupant of the vehicle, suitable reactions may be performed to encourage proper seatbelt use.

Figure 1:
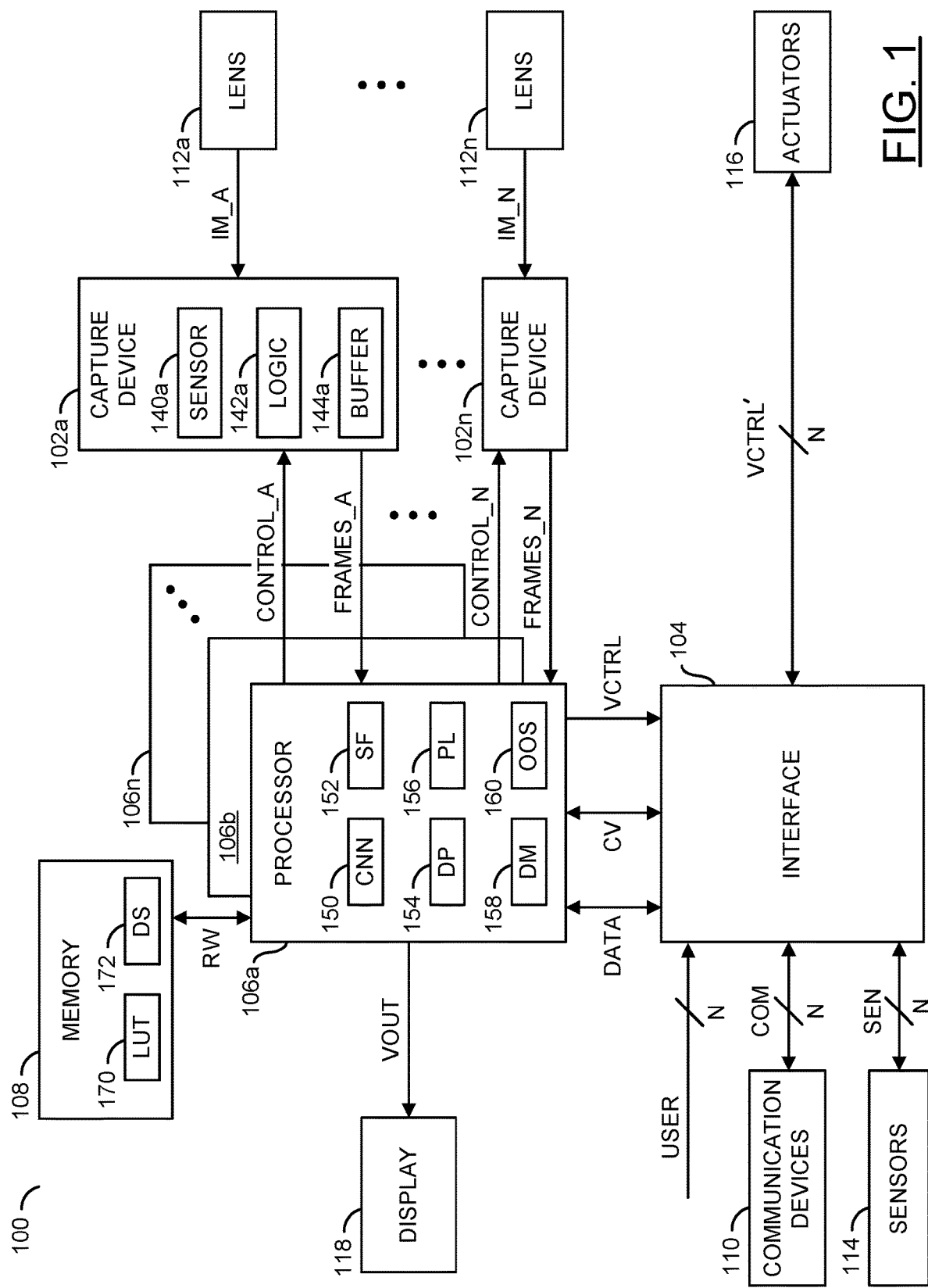
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or a block (or circuit) 118. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuit 118 may implement a display. The apparatus 100 may comprise other components (not shown). The number, type and/or arrangement of the components of the apparatus 100 may be varied according to the design criteria of a particular implementation.

In various embodiments of the apparatus 100, the components 102a-118 may be implemented as a distributed camera system 100. In the distributed system embodiment of the apparatus 100, each component may be implemented separately throughout an installation location (e.g., such as a vehicle). In some embodiments of the apparatus 100, the components 102a-118 may be implemented on a printed circuit board (e.g., a single module). In the single module embodiment, each component may be connected to a single module (e.g., such as a circuit board on a small device such as a drone). In some embodiments, some of the components 102a-118 may be implemented on a single module and some of the components 102a-118 may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle).

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118 may be implemented as part of another one of the components 102a-118. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., the display 118).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 60a-60n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, a signal (e.g., VOUT) and/or send/receive the signal DATA, the signal CV and/or a signal (e.g., RW). The signal VOUT may provide a video data output to the display 118. The signal RW may communicate data to/from the memory 108. The signal VOUT, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170 and/or a block (or circuit) 172. The block 170 may implement a look up table. The block 172 may implement data storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The display 118 may be a screen and/or an output device. In one example, the display 118 may implement an electronic mirror (e.g., an e-mirror). In another example, the display 118 may implement a touchscreen for an infotainment system. In yet another example, the display 118 may implement a back-up camera and/or bird's eye view camera. The display 118 may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118. For example, the processor 106a-106n may provide real-time video streaming to the display 118 via the signal VOUT.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision implemented by the CNN module 150 may be described in association with FIG. 5.

The sensor fusion module 152 may be configured to analyze information from multiple sensors 114 and/or capture devices 102a-102n for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.) and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the display 118 (e.g., the signal VOUT).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of the display 118 by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the display 118. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signal VOUT may be an encoded, cropped, stitched and/or enhanced version of one or more of the signals FRAMES_A-FRAMES_N. The signal VOUT may be a high resolution, digital, encoded, de-warped, stabilized, cropped, blended, stitched and/or rolling shutter effect corrected version of the signals FRAMES_A-FRAMES_N.

Figure 2:
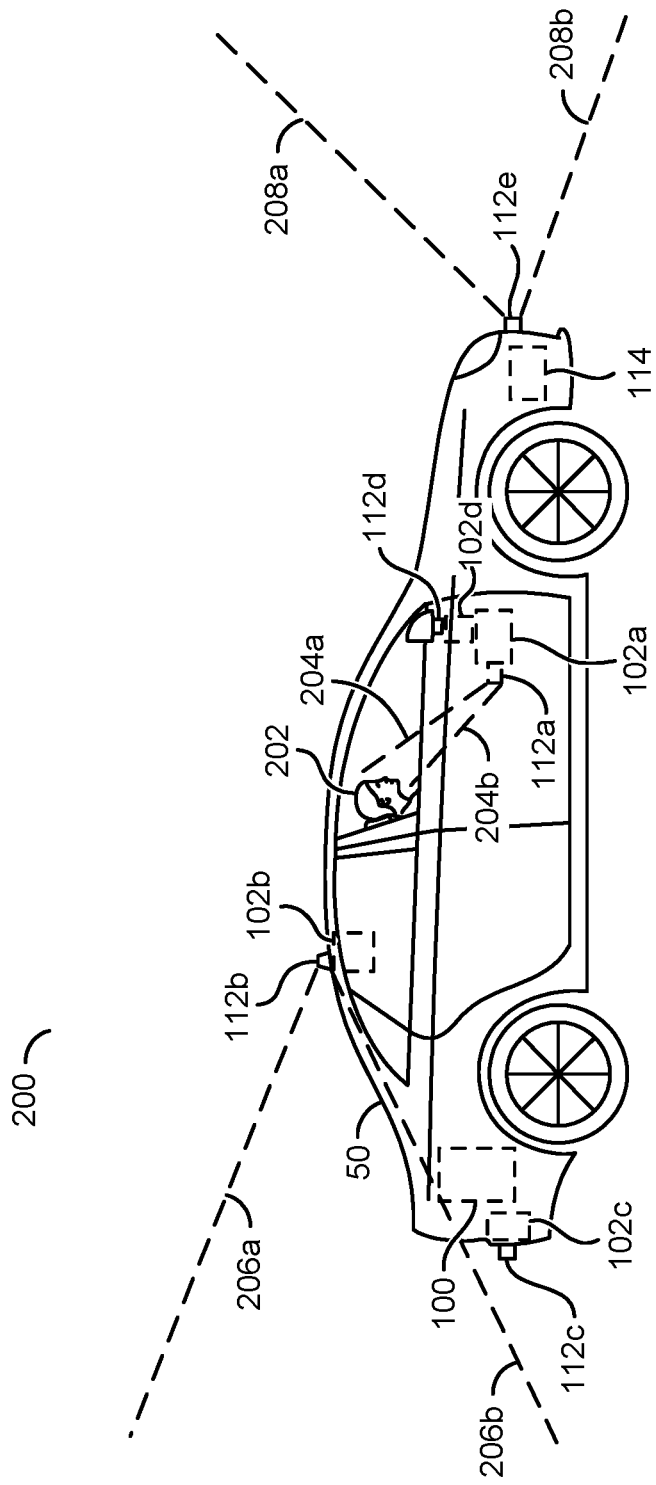
FIG. 2 is a diagram illustrating an example of camera systems inside and outside of a vehicle.

Referring to FIG. 2, an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be implemented to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
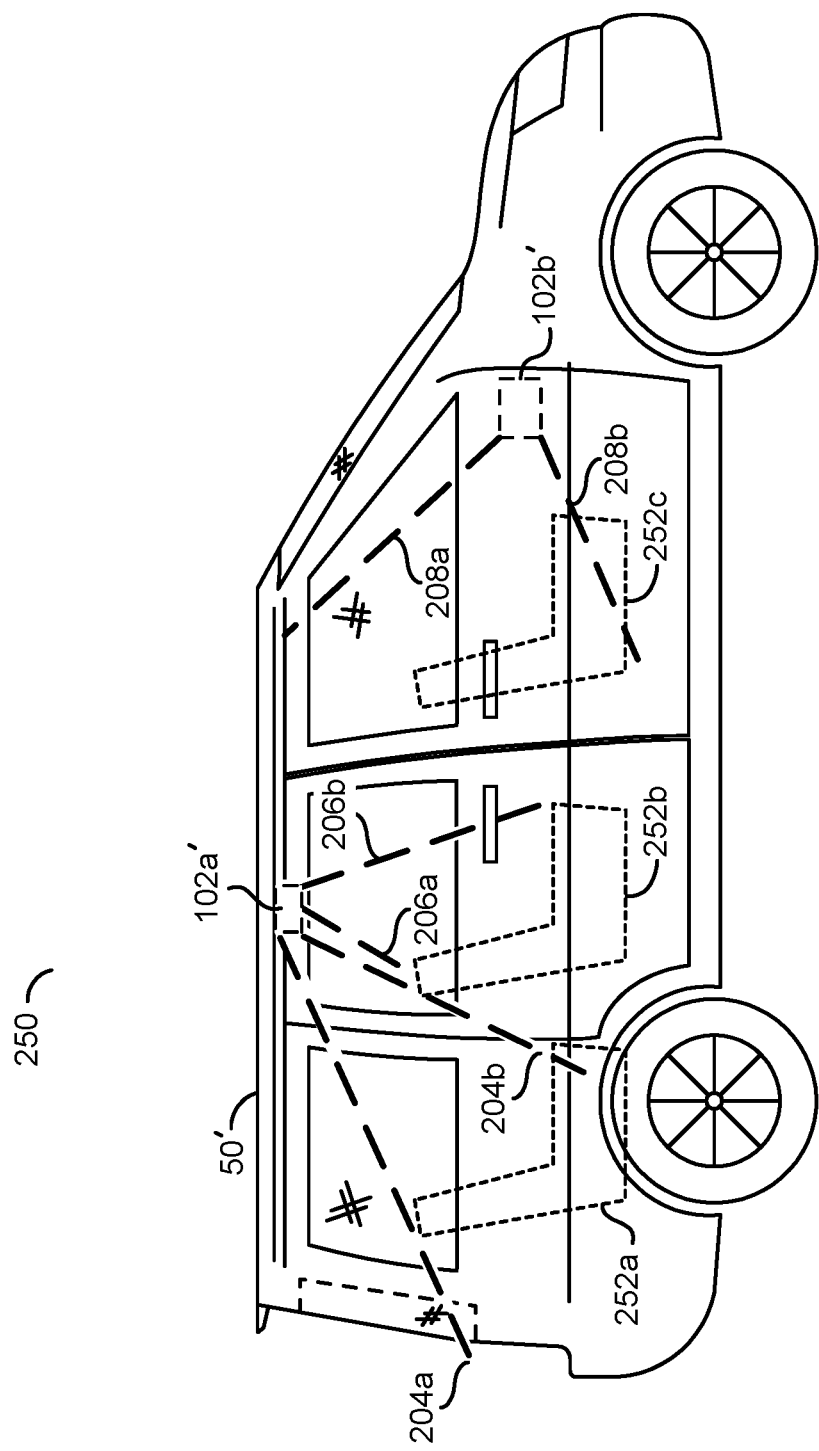
FIG. 3 is a diagram illustrating an example of interior camera systems configured to monitor vehicle occupants.

Referring to FIG. 3, a diagram illustrating an example 250 of interior camera systems configured to monitor vehicle occupants is shown. Various camera angles of an interior of the vehicle 50' are shown. Multiple rows of seats 252a-252c are shown in the vehicle 50'. Each of the rows of seats 252a-252c may be monitored to detect and/or classify one or more occupants of the vehicle 50'.

The capture device 102a' is shown mounted on a ceiling of the vehicle 50'. The capture device 102a' is shown having an angle 204a and an angle 204b (e.g., a field of view) that points toward the back row of seats 252a. The capture device 102a' may also have a field of view angle 206a-206b to capture the middle row of seats 252b. In another example, the capture device 102a' may implement a wide angle lens to capture both rows of seats. The field of view from the angle 204a and the angle 204b may provide a targeted view of the interior of the vehicle 50'. Similarly, the capture device 102b' may capture an interior of the vehicle 50'. An angle 208a and an angle 208b may represent a field of view capturing the front row of seats 252c. The multiple fields of view captured by the capture devices 102a'-102n' may be a targeted wide angle view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver, other occupants, physical characteristics of people in the vehicle, facial expressions of people in the vehicle, fields of view of the people in the vehicle, etc.). The processors 106a-106n may be configured to determine an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person. For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands) and/or determine a vulnerability of an occupant (e.g., a non-moving occupant may be asleep and/or unconscious).

In some embodiments, the processors 106a-106n may implement depth-sensing techniques. The depth-sensing techniques may compare knowledge of the dimensions of the vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50' was parked, when the vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to the display 118 (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

Referring to FIG. 4, a diagram illustrating an object comparison between a reference video frame 300 and a current video frame 300' is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 5). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., DREF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
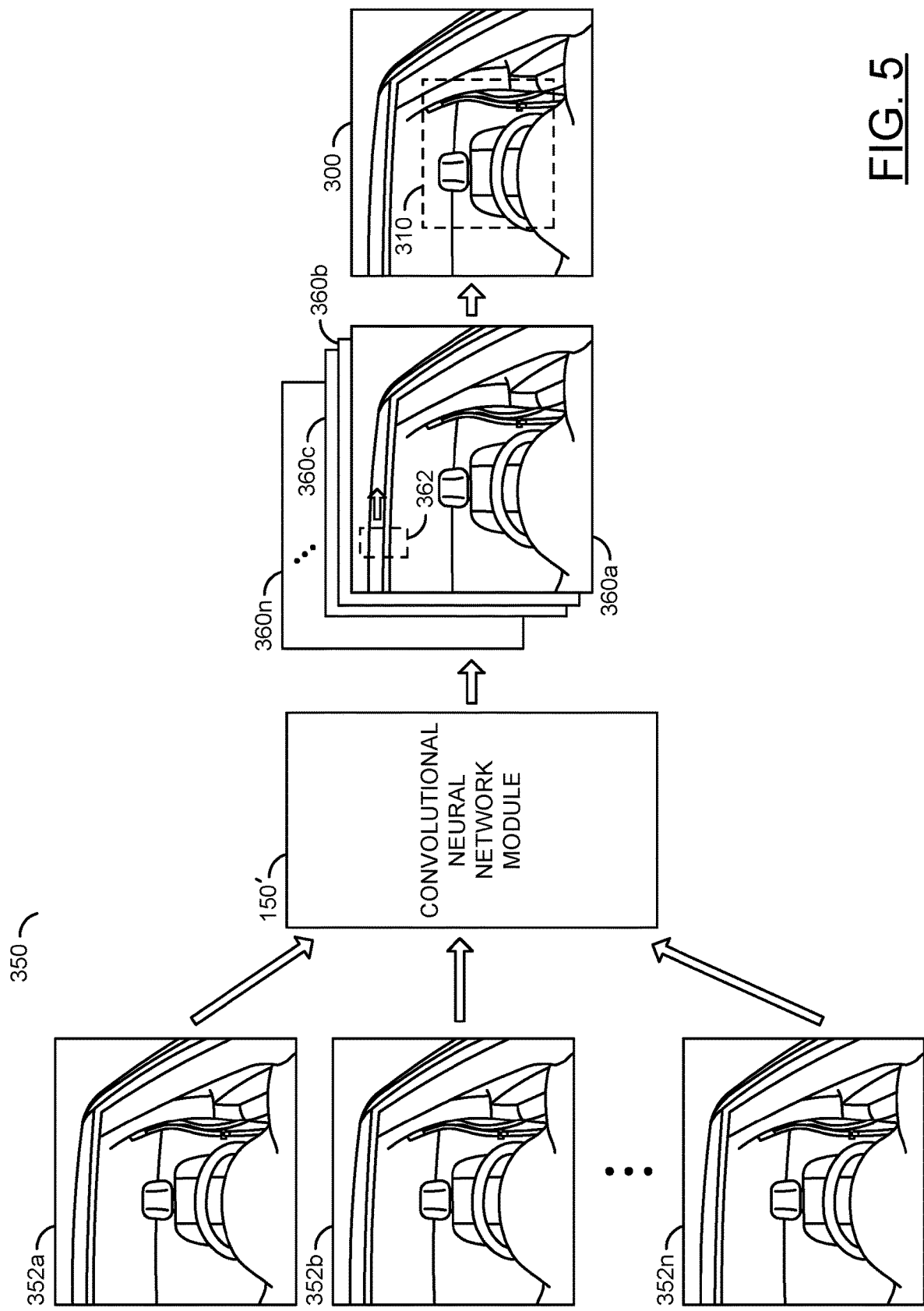
FIG. 5 is a diagram illustrating an example visualization of training a convolutional neural network for object detection using fleet learning.

Referring to FIG. 5, a diagram illustrating an example visualization 350 of training the convolutional neural network 150' for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an unoccupied interior of a vehicle. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, $YC_bC_r$, $YP_bP_r$, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'

Figure 6:
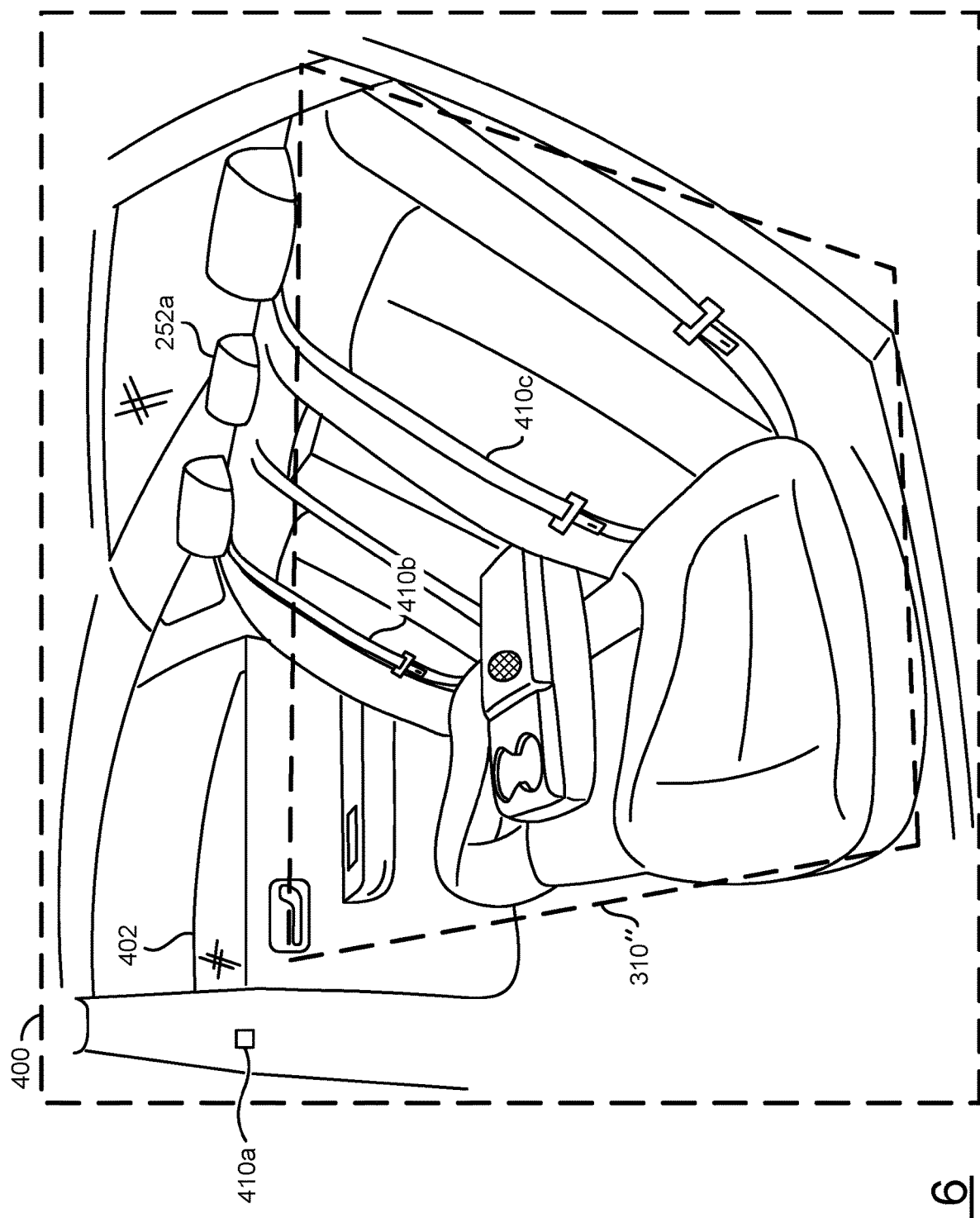
FIG. 6 is a diagram illustrating detecting reference objects corresponding to an empty vehicle seat in a video frame.

Referring to FIG. 6, a diagram illustrating detecting reference objects 310" corresponding to an empty vehicle seat in a video frame 400 is shown. The video frame 400 may be video data (e.g., one example video frame from a series of video frames in the video data) of the interior of the vehicle 50. The video frame 400 may be an example targeted wide angle view of the interior of the vehicle 50 captured by one of the capture devices 102a-102n. The video frame 400 is shown directed at the back row of seats 252a.

In some embodiments, the video frame 400 may be an example of reference frame. For example, the reference frame 400 may be used by the apparatus 100 to learn the locations of various reference objects in the vehicle 50. In another example, the video frame 400 may be used as video data for the training data 352a-352n. In yet another example, the video frame 400 may be an example of a current video frame undergoing the computer vision operations.

An open window 402 is shown in the video frame 400. In some embodiments, the locations of windows may be used to train the CNN module 150. In some embodiments, the processors 106a-106n may determine characteristics of various objects detected in the video frame 400. In the example shown, the processors 106a-106n may determine the characteristic of the window 402 is open.

Examples of mitigation responses 410a-410c are shown in the video frame 400. In some embodiments, the mitigation responses 410a-410c may be deployed and/or activated in response to a collision and/or an imminent collision. For example, the capture devices 102a-102n that provide an exterior view from the vehicle 50 may determine that an impact, collision and/or evasive maneuver is imminent by analyzing the video data and/or using the sensor fusion module 152 to analyze the sensors 114. To protect occupants of the vehicle 50, the mitigation responses 410a-410c may be deployed (e.g., before the impact and/or when the impact is detected). The apparatus 100 may generate the signal VCTRL' to activate one or more of the actuators 116. The actuators 116 may be used to operate on the mitigation response devices 410a-410c.

In the example shown, the mitigation response device 410a may be an air bag (e.g., a side air bag). In the example shown, the mitigation response device 410b and/or the mitigation device 410c may be seatbelts. For example, in response to the imminent collision, the actuators 116 may activate seatbelt pre-tensioning for the seatbelts 410b-410c. In another example, in response to the imminent collision, the actuators 116 may deploy the air bag 410a. The number and/or types of the mitigation response devices 410a-410c implemented may be varied according to the design criteria of a particular implementation. For example, the interface 104 may translate instructions from the processors 106a-106n to corresponding signals compatible with the actuators 116. In some embodiments, the interface 104 may provide an API for the actuators 116. For example, the interface 104 may translate a command to slow down from the processors 106a-106n based on the available actuators 116.

An example detected object 310" is shown. The example detected object 310" may be an unoccupied seat. In some embodiments, the unoccupied seat 310" may be a reference object used for comparison when a person is in the same seat in another video frame. In some embodiments, when the video frame 400 is a current video frame, the unoccupied seat 310" may represent a portion of the vehicle 50 that is the least vulnerable and/or not vulnerable. For example, if the unoccupied seat 310" does not have an occupant, then any mitigation reactions initiated by the apparatus 100 for the unoccupied seat 310" may be considered a low priority.

Figure 7:
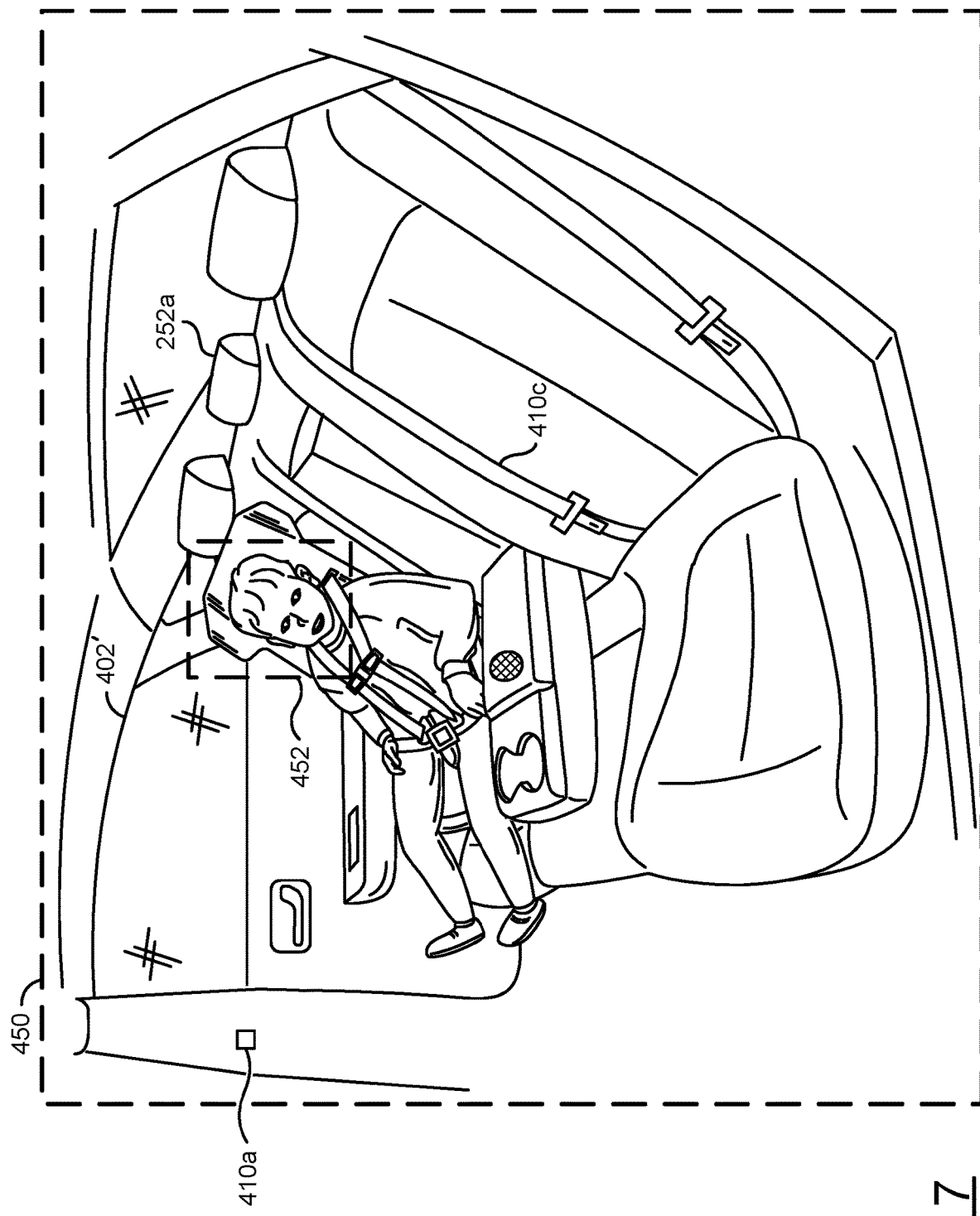
FIG. 7 is a diagram illustrating detecting a child in a video frame.

Referring to FIG. 7 a diagram illustrating detecting an occupant in a video frame 450 is shown. The video frame 450 may be video data (e.g., one example video frame from a series of video frames in the video data) of the interior of the vehicle 50. The video frame 450 may be generated similar to the video frame 400 (e.g., described in association with FIG. 6).

The video frame 450 is shown directed at the back row of seats 252a. An occupant 452 is shown in the video frame 450. In the example shown, the occupant 452 may be a small child. The small child 452 may be an example of a vulnerable occupant.

Generally, the driving policy module 154 may determine a vulnerability of the occupant 452. In some embodiments, different product vendors may program the driving policy module 154 with preferences on how to rank the vulnerability of the occupant 452. In some embodiments, the driving policy module 154 may be programmed according to local regulations. How the vulnerability of the occupant 452 is determined may be varied according to the design criteria of a particular implementation.

The processors 106a-106n may utilize the CNN module 150 to identify, detect and/or classify the occupant 452 (e.g., as a small child, in the example shown). The CNN module 150 may implement the computer vision operations to determine the characteristics of the occupant 452 (e.g., age, body position, whether the occupant is pregnant, etc.). The processors 106a-106n may utilize the classification of the occupant 452 and/or the characteristics of the occupant 452 determined using the computer vision operations in conjunction with the driving policy module 154 to determine the vulnerability of the occupant 452.

The level and/or rank of vulnerability determined by the processors 106a-106n may not imply a weakness, frailty and/or importance of the occupants 452. For example, in a traditional emergency situation, saving women and children is often prioritized. The vulnerability may comprise a likelihood of harm and/or a need for protection. For example, the occupant 452 that is closer to the impact point may be more vulnerable than another of the occupants 452. In another example, particular body parts (e.g., head, chest, arteries, etc.) may be more vulnerable than other body parts due to the risk of catastrophic injury. The level and/or rank of vulnerability of a particular occupant may change (e.g., more vulnerable if a vital body part is exposed, more vulnerable if not wearing a seat belt, less vulnerable if wearing a helmet, etc.). The level and/or rank of vulnerability may be used to prioritize which of the occupants 452 to protect when selecting the impact mitigation reaction.

In one example, a baby may be considered a highly vulnerable occupant. In another example, a healthy adult may be considered less vulnerable than a child. In yet another example, an elderly person may be considered more vulnerable than a healthy adult. In still another example, a person who is pregnant may be considered highly vulnerable. In another example, an empty seat may have the lowest vulnerability ranking since there may be nothing to protect. In yet another example, a pet may be considered less vulnerable than a child. In some embodiments, inanimate objects may have some degree of vulnerability compared to other objects (e.g., a highly valued object might be more important to protect than a worthless item). The level of vulnerability for the occupant 452 may be varied according to the design criteria of a particular implementation.

Generally, each occupant 452 of the vehicle 50 may be detected by the processors 106a-106n. The processors 106a-106n may determine various characteristics of the occupants 452 to determine how vulnerable each occupant may be. Each occupant 452 may be accorded a level of vulnerability according to the driving policy module 154. In an example, the level of vulnerability may enable the processor 106a-106n to rank a vulnerability of each of the occupants (e.g., from highest to lowest).

In some embodiments, based on the vulnerability ranking, the processors 106a-106n may determine how to prioritize any impact mitigation reactions. For example, the safety of a person carrying a child may be prioritized over a healthy adult since the healthy adult may be more likely to withstand injury.

In some embodiments, the processors 106a-106n may implement the computer vision operations to understand how a person may be vulnerable. In an example, a healthy adult may be vulnerable if the adult is riding in the passenger seat having a body position with feet resting on the dashboard (e.g., deploying an air bag as an impact mitigation reaction may cause more harm based on the body position). In another example, particular areas of the body of the occupants 452 may be more vulnerable (e.g., the midsection of a pregnant woman may be more vulnerable than the shoulders of the same person). How the vulnerability of occupants 452 are ranked and/or how different areas of the body of each occupant 452 are ranked may be varied according to the design criteria of a particular implementation.

The CNN module 150 may be configured to classify objects as the occupant 452. The CNN module 150 may further classify the occupant as a particular type and/or class of occupant (e.g., a child, a pet, an adult, an elderly person, a differently-abled person, etc.). The CNN module 150 may further determine characteristics of the occupant 452 based on the characteristics detected. The processor 106a-106n and/or the driving policy module 154 may determine a vulnerability of the occupant 452 based on the classification and/or the characteristics detected using the computer vision operations. The types of object classifications may be varied according to the design criteria of a particular implementation.

The video analytics and/or computer vision operations performed by the CNN module 150 may process the video frame 450 and/or other video signals for biometric markers to determine the characteristics of the occupant 452. For example, one or more of age, height and/or weight may be biometric markers used to determine the vulnerability of the occupant 452. The biometric markers may be used to differentiate between a child, an adolescent, etc. (e.g., a person that may not be capable of protecting themselves) and a young adult, teenager, adult, etc. (e.g., a person that may be less vulnerable).

In some embodiments, the age, height, weight and/or other biometric markers (e.g., characteristics) used to determine the vulnerability of the occupant 452 may be similar to attributes used in regulations for sitting in the front seat of a vehicle and/or other vehicle safety regulations. Various biometric markers may be stored as reference data in the look up table 170. For example, the look up table 170 may store different heights, weights, ages, etc. applicable to different regions (e.g., based on different regulations in a particular city/state/province/country). The types of biometric markers used to determine a vulnerability of the occupant 452 may be varied according to the design criteria of a particular implementation.

In some embodiments, the CNN module 150 may be configured to detect faces in the video frame 450. In some embodiments, the processor 106a-106n may be configured to recognize faces through facial recognition (e.g., based on faces stored as references in the memory 108). The vulnerability of the occupant 452 may be stored in the look up table 170 in association with the facial detection information corresponding to the occupant 452.

A high confidence level for a vulnerability and/or detection of a particular occupant may indicate that the computer vision result is consistent with the particular type of object (e.g., occupant). A low confidence for a vulnerability and/or detection of a particular occupant may indicate that the computer vision result is inconsistent with the particular type of object (e.g., occupant). Various checks may be performed to determine the confidence level. The vulnerability ranking may be performed when the confidence level is above a pre-defined threshold. In some embodiments, information from the vehicle sensors 114 (e.g., an amount of weight detected in a particular seat) may be used to adjust the confidence level.

The impact mitigation may comprise automatic responses by the vehicle 50 (e.g., using the actuators 116) implemented to improve a safety, reduce an amount of injury, increase a chance of survival and/or improve comfort of the occupant 452. For example, the processors 106a-106n may generate the signal VCTRL to the interface 104 and the interface 104 may forward the signal VCTRL' to the appropriate one of the actuators 116 to perform the impact mitigation reaction.

In some embodiments, the window 402' may be one of the mitigation response devices 410a-410c. In the example shown, the window 402' may be determined by the computer vision operations to be in a closed state. For example, opening the window 402' may be an appropriate impact mitigation response to enable the occupant 452 to escape a vehicle after a collision and/or enable rescue workers easier access to the occupant 452 of the vehicle 50. In another example, keeping the window 402' closed may be an appropriate impact mitigation reaction if the vehicle 50 has been submerged in water after a collision to prevent the occupant 452 from drowning.

The apparatus 100 may be configured to distinguish between objects interior to the vehicle 50 (e.g., the small child 452) and objects exterior to the vehicle 50 (e.g., a pedestrian outside the window 402'). For example, depth-sensing techniques may be implemented to determine which of the objects detected in the video frame 450 are inside the vehicle 50. In another example, the video frames from the interior of the vehicle 50 may be compared with video frames of the outside area of the vehicle 50 (e.g., one of the capture devices 102a-102n may capture a similar view outside of the vehicle 50 that may be seen through the window 402' from the video frame 450 captured by another one of the capture devices 102a-102n) to determine which objects are interior and which objects are exterior to the vehicle 50.

Figure 8:
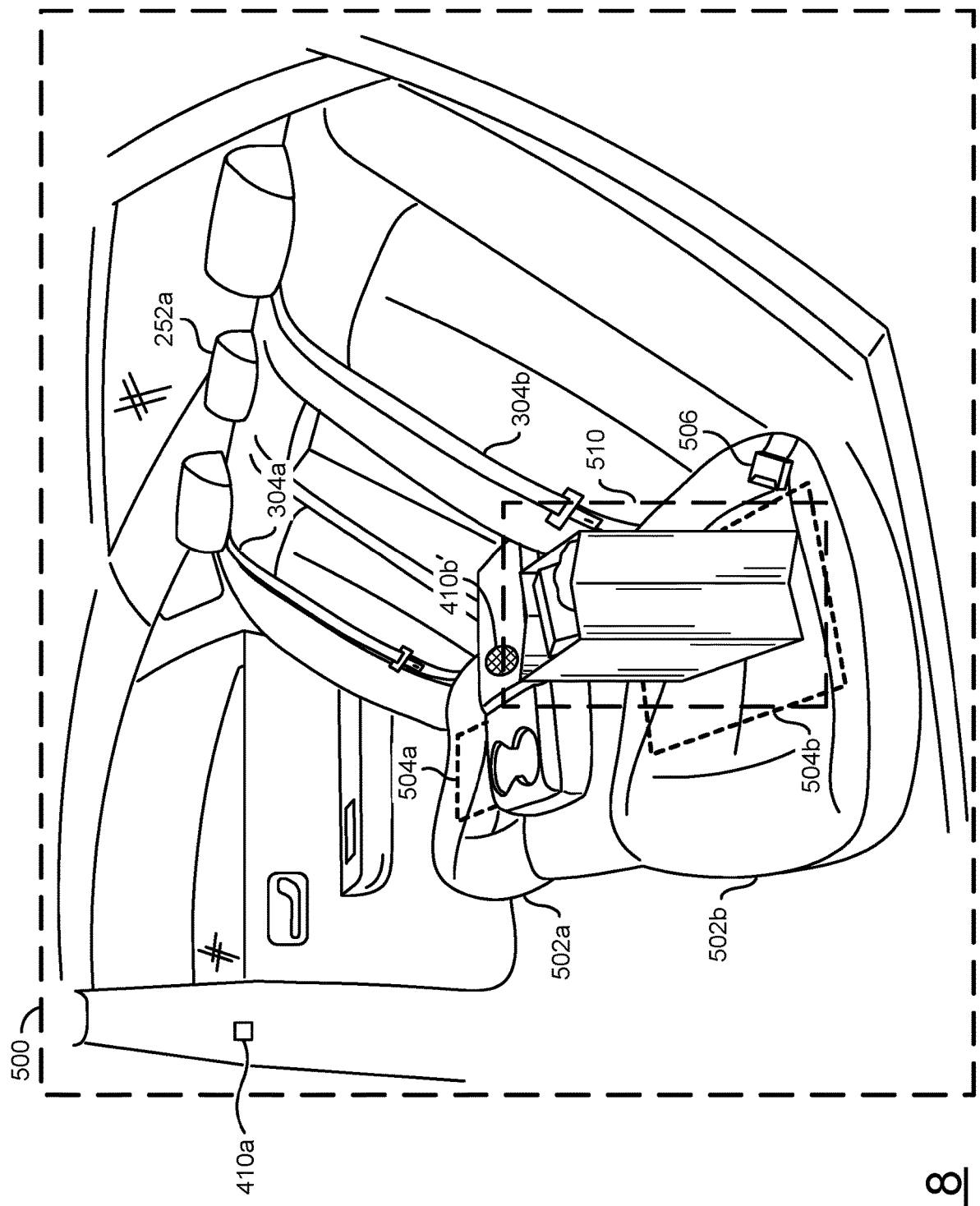
FIG. 8 is a diagram illustrating a processor distinguishing an inanimate object from an occupant in a video frame.

Referring to FIG. 8, a diagram illustrating the processors 106a-106n distinguishing an inanimate object from an occupant in a video frame 500 is shown. The video frame 500 may be video data (e.g., one example video frame from a series of video frames in the video data) of the interior of the vehicle 50. The video frame 500 may be generated similar to the video frame 400 (e.g., described in association with FIG. 6).

The video frame 500 is shown directed at the back row of seats 252a. The back row of seats 252a may comprise a seat 502a and a seat 502b. The CNN module 150 may be configured to detect the seats 502a-502b in the video frame 500 using computer vision. While the example video frame 500 shows the back row 252a, the processors 106a-106n may perform the computer vision operations to detect each seat of the interior of the vehicle 50.

Each of the seats may comprise one or more of the sensors 114. In the example shown, the seats 502a-502b may each comprise a respective pressure sensor 504a-504b. The pressure sensors 504a-504b may be configured to determine an amount of weight present on the seats 502a-502b. For example, the pressure sensors 504a-504b may generate the signal SEN in response to an amount of pressure on the seats 502a-502b. The interface 104 may receive the data from the pressure sensors 504a-504b. In some embodiments, the pressure sensors 504a-504b may provide data corresponding to an amount of weight detected on the seats 502a-502b. In some embodiments, the pressure sensors 502a-502b may provide data that indicates that the amount of weight on the seats 502a-502b is above a pre-determined threshold (e.g., a threshold weight that may approximately correspond with the weight of a person). The pressure sensors 504a-504b are shown in the bottom of the seats 502a-502b. In some embodiments, the pressure sensors 504a-504b may be located in a backrest portion of the seats 502a-502b. The implementation of the pressure sensors 504a-504b may be varied according to the design criteria of a particular implementation.

The seats 502a-502b may each comprise a respective seatbelt 304a-304b. In the example shown, the seatbelts 304a-304b may be a single over-the-shoulder strap. In some embodiments, the seatbelts 304a-304b may be five-point seatbelts. The CNN module 150 may be configured to perform computer vision operations on the video data of the video frame 500 to determine the status of the seatbelts 304a-304b. In the example shown, the processors 106a-106n may determine that the seatbelts 304a-304b are in a default (e.g., unworn) position. In the example frame 500, seatbelts 304a-304b are shown, but generally the CNN module 150 may detect a seatbelt status for each of the seats 504a-504n and/or each seatbelt 304a-304n of the vehicle 50, only a portion of which are shown.

A seatbelt connector 506 is shown on the seat 502b. The seatbelt connector 506 may correspond with the seatbelt 304b. The seatbelt 502b may be worn by connecting the seatbelt 304b with the seatbelt connector 506. The seatbelt connector 506 may provide a secure connection for the seatbelt 304b.

In some embodiments, the seatbelt connector 506 may comprise one or more of the vehicle sensors 114. The sensors 114 implemented by the seatbelt connector 506 may be used to determine whether the seatbelt 304b is connected. For example, the sensors 114 implemented by the seatbelt connector 506 may provide the signal SEN to indicate whether or not the seatbelt 304b is secured in the seatbelt connector 506 (e.g., whether the status of the belt 304b is buckled or unbuckled).

An inanimate object 510 is shown on the seat 502b. In the example shown, the inanimate object 510 may be a grocery bag. Many drivers store inanimate objects on the car seats (e.g., a backpack, a sports bag, purchased goods such as groceries, etc.). Since the inanimate object 510 may be heavy, the inanimate object 510 may be detected by the pressure sensor 504b. For example, based on the input from the pressure sensor 504b alone, there may be a false assumption that the seat 504b is occupied by a person. Since the seatbelt 304b is not connected to the seatbelt connector 506, a false assumption may be made that the seat 502b is occupied by a person and the person is not properly wearing a seatbelt.

The computer vision operations implemented by the processors 106a-106n may be configured to override a seatbelt warning (e.g., when there is a false positive due to incorrect assumptions from the vehicle sensors 114). For example, a warning from the reaction device 410b' (e.g., an audible warning from a speaker) may be suppressed by the processors 106a-106n.

In response to the computer vision operations, the processors 106a-106n may be configured to distinguish between the inanimate object 510 and an occupant of the vehicle 50 (e.g., the child 452 shown in association with FIG. 7). The processors 106a-106n may be configured to detect the occupants of the vehicle 50, the seats 502a-502b, determine the status of the seatbelts 304a-304b and/or select a reaction in order to encourage proper usage of the seatbelts 304a-304b. For example, the reaction may be selected based on the characteristics of the occupants of the vehicle 50. In an example, the computer vision operations may enable the processors 106a-106n to determine whether the seatbelt 304b is connected to the seatbelt connector 506. Using the computer vision operations may enable the processors 106a-106n to avoid false positives and/or select an appropriate reaction based on the scenario detected.

In some embodiments, the reaction selected by the decision module 158 may be to enable an audio warning (e.g., using the speaker 410b'). In some embodiments, the reaction selected by the decision module 158 may be to suppress an audio warning. For example, the processors 106a-106n may override (e.g., suppress) an audio warning generated in response to the pressure sensor 504b. The reaction selected by the decision module 158 may be varied according to the design criteria of a particular implementation.

In the example video frame 500 shown, the CNN module 150 may detect that the status of the seatbelts 304a-304b are each not connected. The CNN module 150 may determine that the seat 502a is not occupied. For example, the reaction determined by the decision module 158 for an unoccupied seat may be to do nothing. The CNN module 150 may determine that the seat 502b is occupied. The computer vision operations may determine that the seat 502b is occupied by the inanimate object 510 and the object 510 is a bag of groceries. The processors 106a-106n may determine that the seat 502b is not occupied by a person. Since the seat 502b is not occupied, the decision module 158 may not perform a reaction.

In some embodiments, the computer vision operations may be performed after the pressure sensors 504a-504b have detected the presence of an object. In some embodiments, sensor fusion may be performed by the sensor fusion module 152 in order to combine knowledge from the mechanical sensors 114 with the analysis so of the computer vision operations. In some embodiments, the computer vision operations may be delayed until the sensors 114 have provided a preliminary detection. For example, waiting to perform the computer vision operations may conserve power. In an example, the computer vision operations may not be performed on the seat 502a since no weight is present. Since a weight is detected by the pressure sensor 504b, the processors 106a-106n may perform a secondary check of the detection using computer vision operations. After the weight is detected, the CNN module 150 may determine that the weight is caused by the detected grocery bag 510 and the reaction may be suppressed.

Generally, the reaction by the decision module 158 may be selected in response to the objects detected by the processors 106a-106n. For example, if no person (e.g., occupant) is detected, then no reaction may be selected. If a person is detected, the reaction may be selected based on the status of the seatbelts 304a-304n. For example, if the seatbelt is worn properly, no reaction may be selected. If one or more of the seatbelts 304a-304b are not worn properly, then one or more reactions may be selected. The reactions may be selected based on the characteristics of the occupants and/or the status of the seatbelts 304a-304b.

Figure 9:
FIG. 9 is a diagram illustrating a processor determining a pattern of movement in a video frame.

Referring to FIG. 9, a diagram illustrating the processors 106a-106n determining a pattern of movement in a video frame 550 is shown. The frame 550 may be one frame of a sequence of video frames of the interior of the vehicle 50 analyzed by the processors 106a-106n. The sequence of frames may be analyzed to determine a pattern of movements of the driver 202' over time. The processors 106a-106n may detect the pattern of movements of the driver 202' (or other occupants of the vehicle 50) to determine what action the driver 202' is performing.

In the example video frame 550, the driver 202' is shown in the seat 502 (e.g., the seat 502 is occupied). The seatbelt 304 is shown in the process of being connected to the seatbelt connector 506 (e.g., the status of the seatbelt 304 is not connected). The headrest 302 is shown behind the head of the driver 202'.

In some embodiments, since the seat 502 is occupied and the status of the seatbelt 304 is not connected, the reaction may be selected to encourage proper usage of the seatbelt 304. For example, the pressure sensor 504 may detect the weight of the driver 202' and correctly assume the seat 502 is occupied and the seatbelt connector 506 may detect that the seatbelt 304 is not connected. In another example, performing the computer vision operations on the example video frame 550 in isolation (e.g., without additional context taken from a series of video frames) may determine that the seat 502 is occupied by the driver 202' and the status of the seatbelt 304 is not connected.

However, in the example video frame 550 the driver 202' may be in the process of connecting the seatbelt (e.g., the driver 202' may be currently securing the seatbelt 304 to the seatbelt connector 506). The processors 106a-106n may perform the computer vision operations to understand the context of the example video frame 550. By understanding the context (e.g., that the driver 202' is in the process of connecting the seatbelt 304), the decision module 158 may determine that the status of the seatbelt 304 may soon be connected and the reaction may not be needed (e.g., proper seatbelt usage may occur soon).

The processors 106a-106n may determine the context of the video frame 550 by examining a sequence of video frames (e.g., video frames that are temporally near the video frame 550). Examining the sequence of video frames may enable a pattern of movement of the occupant 202' to be detected. In an example, the video frames prior to the video frame 550 may show the driver 202' reaching over to grab the seatbelt 304 and pulling the seatbelt 304 across the body and towards the seatbelt connector 506. The sequence of motions performed by the driver 202' may correspond to a pattern of motion of connecting the seatbelt 304 to the seatbelt connector 506. Since the pattern of motions corresponding to the video frame 550 may indicate that seatbelt will be connected (e.g., proper seatbelt usage), then the reaction selected may be to do nothing.

The processors 106a-106n may implement deep learning to detect the pattern of movements. The deep learning may analyze and/or monitor a sequence of video frames to determine context, understand what particular objects in the sequence of video frames are doing and/or predict what the particular objects in the sequence of video frames may do next. In some embodiments, the processors 106a-106n may monitor the sequence of video frames (e.g., including the example video frame 550) and delay the reaction to the unbuckled status of the seatbelt 304 until the pattern of movements is confirmed. For example, the pattern of movements for buckling the seatbelt 304 may start with a movement (or state) of reaching over the shoulder. If the processors 106a-106n detect the driver 202' reaching over the shoulder, the reaction may be delayed. The next movement of the pattern of movements may be grabbing the seatbelt 304 and pulling the seatbelt across the body of the driver 202'. For example, if the driver 202' does not grab the seatbelt 304 and pull the seatbelt 304 down across the chest (e.g., the driver 202' reached over the shoulder to scratch an itch and not to buckle the seatbelt 304), then the appropriate reaction to encourage proper seatbelt use may be performed (e.g., since improper seatbelt usage has been detected and may likely continue). For example, if the driver 202' does grab the seatbelt 304 and pull the seatbelt 304 down across the chest, then the reaction may be further delayed.

The reaction may continue to be delayed as long as the occupant (e.g., the driver 202') continues to perform the pattern of movements that correspond to adjusting the seatbelt for proper usage (e.g., buckling the seatbelt 304). The pattern of movements may correspond to a particular amount of time (e.g., a pre-determined amount of time for buckling the seatbelt 304). For example, if the driver 202' takes too long to perform the pattern of movements, the reaction may be initiated by the processors 106a-106n (e.g., to prevent an occupant from trying to fake the pattern of movements in order to prevent the reaction). Each stage of the pattern of movements may correspond to a time range, and the sequence of movements may need to fit within the time range in order for the sequence of movements to fit the pattern of movements that may suppress the reaction.

In the example pattern of movements for buckling the seatbelt, the pattern of movements may end with connecting the seatbelt 304 to the seatbelt connector 506. For example, the reaction may be delayed while the driver 202' is in the process of buckling the seatbelt 304, and the reaction may not be performed when the processors 106a-106n have determined that the pattern of movements has been completed. If the pattern of movements is interrupted, stopped and/or the processors 106a-106n determine that the pattern of movements is not for adjusting the seatbelt status for proper usage, then the reaction may be selected and/or performed. While the example provided for the pattern of movements may described delaying the reaction for movements that correspond to buckling the seatbelt 304, the reaction and/or the pattern of movements may be varied according to the design criteria of a particular implementation.

In another example, the pattern of movements monitored may correspond to temporarily unbuckling the seatbelt 304 and then re-buckling the seatbelt 304. For example, the driver 202' may desire to adjust the seatbelt 304 by unbuckling, performing the adjustment and then re-buckling the seatbelt 304. While performing the adjustment, the computer vision operations performed by the CNN module 150 may detect that the status of the seatbelt 304 is unbuckled (e.g., improper usage). Initiating the reaction in response to detecting the status of the seatbelt 304 may be an annoyance to the driver 202' when adjusting the seatbelt 304. The processors 106a-106n may monitor the sequence of motions and recognize that the pattern of movements corresponds to adjusting the seatbelt 304. The processors 106a-106n may delay the initiation of the reaction when the status of the seatbelt 304 is unbuckled in response to detecting the pattern of movements. If the driver 202' re-buckles the seatbelt 304 within a pre-determined amount of time (e.g., 10 seconds) the reaction may be suppressed (e.g., not performed). If the driver 202' does not re-buckle the seatbelt 304 within the pre-determined amount of time, the reaction may be initiated (e.g., the signal VCTRL may be presented to the actuators 116 to perform the selected reaction).

The pattern of movements may be detected based on analyzing objects and/or how objects have moved and/or changed from frame to frame. For example, the sequence of video frames may be processed in the video pipeline 156 (e.g., the video pipeline 156 may process a number of the video frames in parallel). The CNN module 150 may detect one or more objects in each of the video frames of the sequence of video frames. The processors 106a-106n may determine and/or track how the position and/or orientation of the objects change from frame to frame (e.g., a difference delta may be determined from frame to frame for the detected objects). The processors 106a-106n may compare the objects and/or the difference deltas across the sequence of video frames to estimate a pattern and/or understand the sequence of movements of the objects.

In some embodiments, the pattern of movements may be confirmed based on information from other sensors. In one example, if the computer vision operations detect that the seatbelt 304 has been connected to the seatbelt connector 506, the detection may be confirmed by an audio detected using a microphone (e.g., the sound of the seatbelt clicking when connected may provide a confirmation). The type of information used to confirm the pattern of movements detected may be varied according to the design criteria of a particular implementation.

Figure 10:
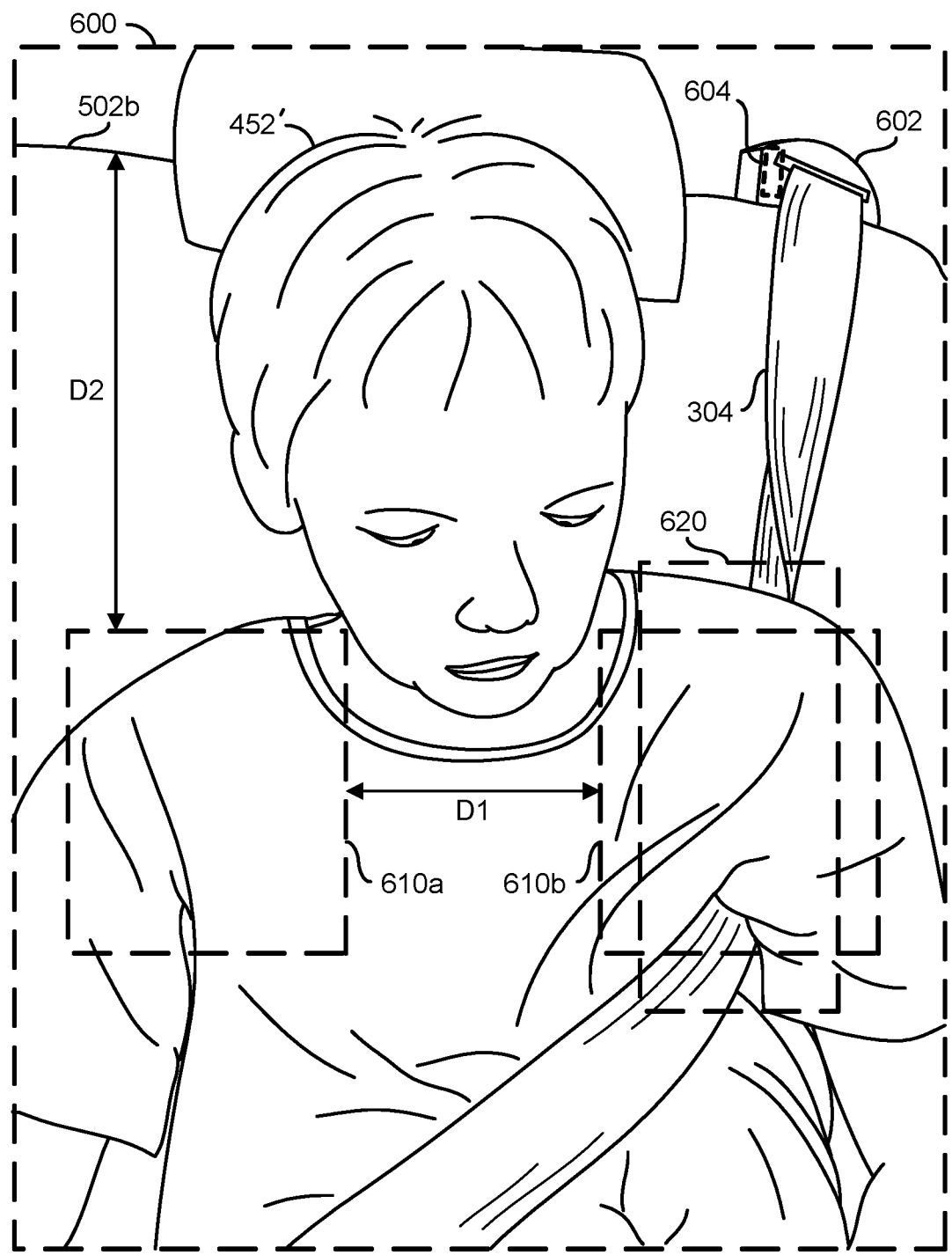
FIG. 10 is a diagram illustrating a processor determining characteristics of an occupant and/or a state of a seatbelt.

Referring to FIG. 10, a diagram illustrating the processors 106a-106n determining characteristics of an occupant and/or a state of a seatbelt is shown. An example video frame 600 is shown. The example video frame 600 may be one of the frames FRAMES_A-FRAMES_N captured using one of the capture devices 102a-102n directed at the seat 502b (e.g., of the back row of seats 252a). The occupant 452' is shown in the seat 502b. The seatbelt 304 is shown worn by the occupant 452'. In the example shown, one occupant 452' in one seat 502b is shown being analyzed. However, the apparatus 100 may be configured to detect numerous seats (e.g., the seats 502a-502n, not shown), seatbelts (e.g., the seatbelts 304a-304n, not shown) and/or occupants (e.g., the occupants 304a-304n, not shown) for the entire interior of the vehicle 50. While only one occupant, seat and/or seatbelt may be shown for illustrative purposes, aspects of the invention 100 may be similarly applicable and/or performed for each of the seats 502a-502n, seatbelts 304a-304n and/or occupants 452a-452n.

An adjustable shoulder hinge 602 is shown. The seatbelt 304 may pass through the adjustable shoulder hinge 602. The adjustable shoulder hinge 602 may enable the seatbelt 304 to be adjusted to provide proper support for the occupant 452'. A block (or circuit) 604 is shown within the adjustable shoulder hinge 602. The circuit 604 may implement a motor. For example, the circuit 604 may implement a servo motor configured to control the adjustable shoulder hinge 602. The motor 604 may be one of the actuators 116. For example, the signal VCTRL' generated in response to the processors 106a-106n may be configured to control the motor 604.

The motor 604 may be configured to automatically adjust the seatbelt 604. For example, the processors 106a-106n may analyze the video frame 600 to determine the characteristics of the occupant 452' (e.g., size of the passenger, height of the passenger, location of the shoulders of the passenger, etc.). The processors 106a-106n may generate the signal VCTRL to control the motor 604 to enable the adjustable shoulder hinge 602 to automatically adjust the seatbelt 304 to encourage proper usage.

The CNN module 150 may analyze the video frame 600 to determine the characteristics of the occupant 452'. Boxes 610a-610b are shown in the video frame 600 to represent various body parts of the occupant 452' that may be identified using computer vision. The body parts 610a-610b may be used by the processors 106a-106n to determine the characteristics of the occupant 452'. For example, the body parts 610a-610b may be used to determine a size, orientation, position and/or location of the occupant 452' (e.g., relative to the interior of the vehicle 50 and/or relative to the seat 502b). In the example shown, the processors 106a-106n may identify the shoulders 610a-610b of the occupant. The body parts identified may be varied according to the design criteria of a particular implementation.

In the example shown, the box 610a may represent a right shoulder of the occupant 452a' and the box 610b may represent a left shoulder of the occupant 452'. The shoulders 610a-610b may represent characteristics of the occupant 452' that have been detected by the processors 106a-106n. A distance D1 is shown between the boxes representing the shoulders 610a-610b. The distance D1 may be used to determine the size and/or width of the occupant 452'. The distance D1 may be illustrative and the determination of the distance D1 may be more accurate than measurements to the boxes 610a-610b shown. For example, the reaction selected by the processor 106a-106n may be to automatically adjust the seatbelt 304 based on the size of the occupant 452'. For example, the processors 106a-106n may be configured to identify the body parts 610a-610b in the video frame 600 and measure a distance between the body parts 610a-610b.

A distance D2 is shown between the shoulder 610a and the top of the seat 502b. The distance D2 may be used to determine a size of the occupant 452' relative to the seat 502b. The distance D2 may be illustrative and the determination of the distance D2 may be more accurate than measurements to the box 610a shown. For example, the reaction selected by the processors 106a-106n may be to automatically adjust the seatbelt 304 based on the location and/or height of the occupant 452' relative to the seat 502b.

A box 620 is shown in the video frame 600. The box 620 may represent a location of a discontinuity (e.g., a hidden portion) of the seatbelt 304. The CNN module 150 may be configured to detect the discontinuity 620. The discontinuity 620 may represent improper seatbelt usage. In the example shown, the discontinuity 620 may be detected in the video frame 600 because the seatbelt is improperly tucked under the arm of the occupant 452'. The discontinuity 620 may indicate that the status of the seatbelt is connected but not worn properly. In response to the improper seatbelt usage, the decision module 158 may select an appropriate response. For example, the appropriate response may be to play an audible warning tone.

The decision module 158 may select an appropriate reaction in response to the characteristics of the occupant 452' and/or the status of the seatbelt 304 determined from the computer vision operations. The appropriate reaction may correspond to the scenario detected. In some embodiments, the appropriate response to encourage proper seatbelt usage may comprise playing audio, activating/deactivating a warning light, presenting a message on an infotainment system (e.g., a touchscreen display), automatically adjusting the seatbelt 304, pre-tensioning the seatbelt 304, releasing the seatbelt 304 (e.g., after an accident if the occupant 452' is trapped in the vehicle 50), etc. The number and/or types of reactions available for selection may be varied based on the design criteria of a particular implementation and/or the capabilities (e.g., features available) of the vehicle 50.

In one example, the CNN module 150 may detect the shoulders 610a-610b and the seatbelt 304 and the processors 106a-106n may calculate the distance between the shoulders D1 and/or determine that the status of the seatbelt 304 is buckled. The decision module 158 may select the appropriate response. An audible tone may not be appropriate because the seatbelt 304 is buckled (e.g., one form of proper usage). However, the appropriate usage that may be encouraged may be a proper fit for the seatbelt 304. The decision module 158 may determine the proper fit for the seatbelt 304 based on the height, width and/or size of the occupant 452'. The decision module 158 may determine an amount of adjustment for the seatbelt 304 based on the current status of the seatbelt 304. The processors 106a-106n may present the amount of adjustment as the signal VCTRL. The motor 604 may receive the signal VCTRL' and perform the adjustment to the seatbelt 304 by adjusting the shoulder hinge 602 in response to the signal VCTRL'.

In another example, the CNN module 150 may detect the discontinuity 620 and the seatbelt 304. The processors 106a-106n may determine that the status of the seatbelt 304 is buckled but not properly worn. The decision module 158 may select the appropriate response. Performing an adjustment may not be the appropriate response (e.g., since the seatbelt 304 is detected to be not worn properly and adjusting the seatbelt 304 may cause an injury). The decision module 158 may determine that the appropriate response to encourage proper seatbelt usage may be to play an audible tone and/or display a warning light and/or message. The processors 106a-106n may implement the selected reaction by generating the signal VCTRL to one or more of the actuators 116 (e.g., a dashboard light, the speaker 41b', a touchscreen display of an infotainment system, etc.).

In the example shown, the processors 106a-106n may determine whether the seatbelt 304 has been properly worn. However, the processors 106a-106n may detect and/or determine appropriate usage of other objects within the interior of the vehicle 50. For example, the position of the headrest 302 with respect to the occupant 452' may be analyzed using the computer vision operations and the reaction may be performed to encourage proper usage of the headrest 302 (e.g., to ensure that the headrest 302 is at the proper height to protect the head of the occupant 452'). In another example, an angle of recline of the seat 502b may be analyzed using the computer vision operations to encourage the safety of the occupant 452'. For example reclining the seat 502b back too far may cause a safety issue with seatbelt usage. The type of analysis performed and/or the components of the vehicle 50 analyzed may be varied according to the design criteria of a particular implementation.

The decision module 158 may determine the amount and/or type of adjustment performed by the shoulder hinge 602 and/or the motor 604. In one example, the motor 604 may adjust the fit of the seatbelt 304 by moving the shoulder hinge 602 along a track (e.g., up or down). Moving the shoulder hinge 602 up or down may adjust the height and/or angle of the seatbelt 304 in response to the height characteristic of the occupant 452'. For example, the height of the shoulder hinge 602 may be adjusted so that the seatbelt 304 passes over the collarbone of the occupant 452' (e.g., avoids the face and neck of the occupant 452') to ensure a proper (or recommended) fit.

Various types of adjustments and/or reactions may be implemented by the decision module 158. In some embodiments, the motor 604 may be configured to adjust the recline of the seat 502b. For example, moving the seat 502b to the upright position may be recommended for proper seatbelt usage. In some embodiments, the motor 604 may be configured to adjust a location of the seat 502b. For example, the motor 604 may move the seat 502b forward or backward (e.g., farther away from the dashboard) to a location that may be recommended for proper seatbelt usage. In some embodiments, the motor 604 may control a tightness of the seatbelt 304. For example, the motor 604 may be configured to adjust the seatbelt 304 for a tight (e.g., snug) fit to provide sufficient restraint.

In some embodiments, the adjustments and/or reactions implemented by the decision module 158 may be based on the characteristics of the occupant 452' and/or locations of the body parts 610a-610b. The motor 604 may adjust the angle of the seatbelt 304 to a proper position with respect to the body of the occupant 452'. In one example, the proper position for the shoulder strap of the seatbelt 304 may be over the collarbone and across the chest (e.g., one or more of the body parts detected using the computer vision operations). In another example, the proper position for the shoulder strap of the seatbelt 304 may be away from the face and neck. In yet another example, the proper position for the waist strap of the seatbelt 304 may be across the hips. In still another example, the proper position for the waist strap of the seatbelt 304 may be away from the stomach.

In some embodiments, the characteristics of the occupant 452' may comprise determining if the occupant 452' is pregnant. For example, the computer vision operations may detect a baby bump on the belly of the occupant 452'. The adjustment and/or reaction of the decision module 158 may be configured to ensure the seatbelt 304 is worn and/or the fetus is protected. In one example, the decision module 158 may perform the adjustments using the motor 604 to ensure that the shoulder strap of the seatbelt 304 is oriented between the breasts and clear of the baby bump. In another example, the decision module 158 may perform the adjustments using the motor 604 to ensure that the waist strap of the seatbelt 304 is oriented across the hips and below the baby bump.

In some embodiments, the characteristics of the occupant 452' may comprise determining if the occupant 452' is above or below a threshold height for the seatbelt 304. In one example, the reaction implemented by the decision module 158 may be a notification that a child is too short for the seatbelt 304 and that a booster seat should be installed. In another example, the reaction implemented by the decision module 158 may be a notification that a person is too tall for the seatbelt 304 and that an aftermarket product (e.g., a seatbelt extender) should be installed.

In some embodiments, the computer vision operations may be performed on the seatbelt 304 to determine a twisted status. For example, if the seatbelt 304 is twisted, the effectiveness of the seatbelt 304 may be reduced. In some embodiments, the reaction selected by the decision module 158 may be to provide an instructional video using the infotainment system display of the vehicle 50. For example, the infotainment system may be configured to display the problem with the seatbelt (e.g., the location of the twist, the location of the discontinuity 620, the location of the strap, etc.) and/or provide visual instructions on how to remedy the problem. In an example, the computer vision operations may detect that the seatbelt 304 is twisted, and the reaction may be an instructional video on how to untwist the seatbelt 304.

In some embodiments, the apparatus 100 may implement multiple camera angles in order to encourage proper seatbelt usage. In one example, one camera (e.g., one of the capture devices 102a-102n) may provide a view of the seatbelt and another camera may provide a profile view of the occupant to check that the back and hips of the occupant 452' are against the seat 502b (e.g., to ensure that the occupant 452' is in a recommended seating position to enable proper seatbelt usage). In some embodiments, a manual over-ride may be provided (e.g., by interacting with the touchscreen display of the infotainment system) to provide an option for the occupant 452' to disable the reaction(s) implemented in response to the computer vision operations.

Figure 11:
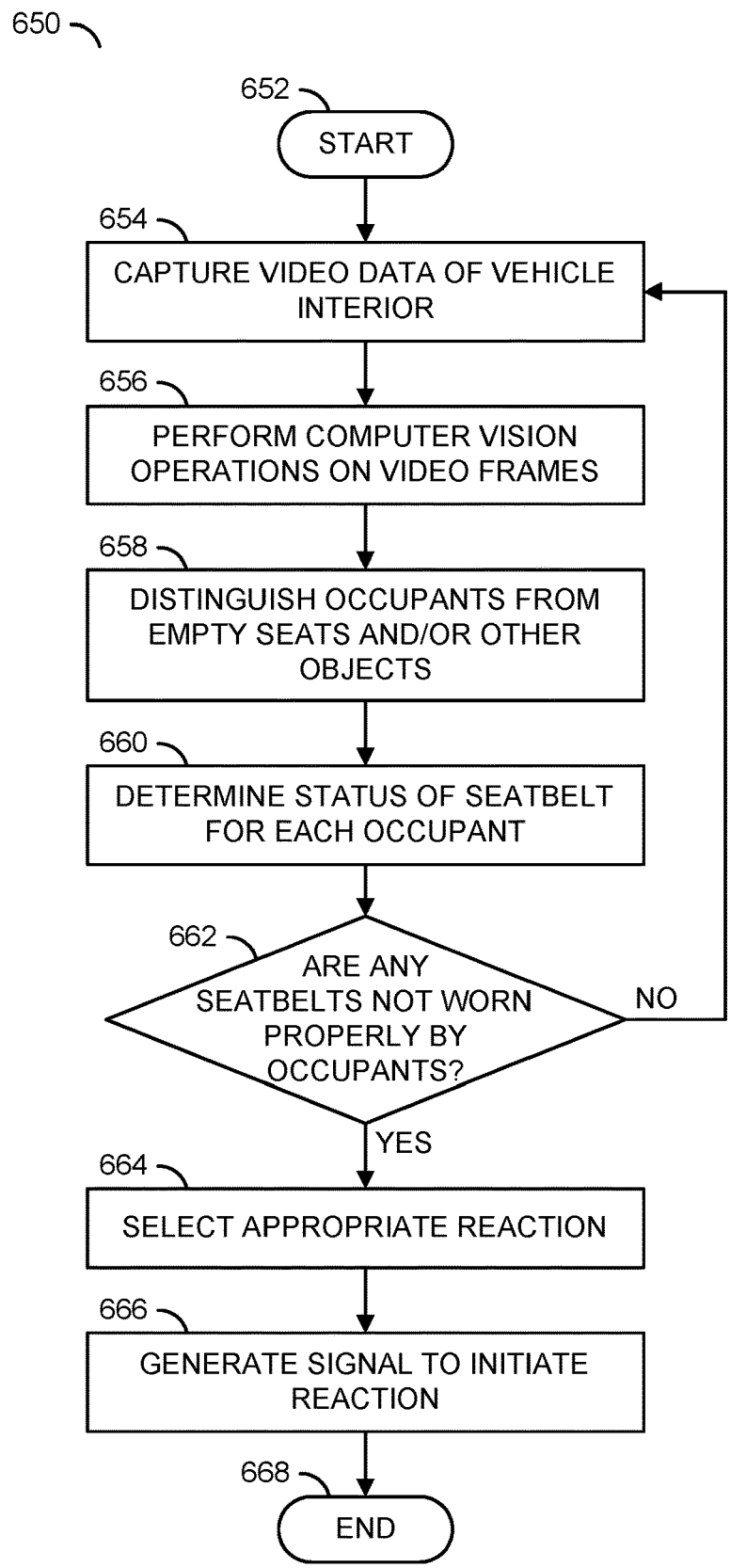
FIG. 11 is a flow diagram illustrating a method for implementing seatbelt detection using computer vision.

Referring to FIG. 11, a method (or process) 650 is shown. The method 650 may implement seatbelt detection using computer vision. The method 650 generally comprises a step (or state) 652, a step (or state) 654, a step (or state) 656, a step (or state) 658, a step (or state) 660, a decision step (or state) 662, a step (or state) 664, a step (or state) 666, and a step (or state) 668.

The step 652 may start the method 650. In the step 654, the capture devices 102a-102n may capture video data (e.g., the signals FRAMES_A-FRAMES_N) of the interior of the vehicle 50. Next, in the step 656, the CNN module 150 may perform the computer vision operations on the video frames. In the step 658, the CNN module 150 may distinguish occupants (e.g., the occupants 452a-452n) from empty seats and/or other objects (e.g., the inanimate object 510). In the step 660, the processors 106a-106n may use the information from the computer vision operations to determine the status of the seatbelts 304a-304n for each of the occupants in the vehicle 50. Next, the method 650 may move to the decision step 662.

In the decision step 662, the processors 106a-106n may determine whether any of the seatbelts 304a-304n are not worn properly by the occupants. For example, the seatbelts 304a-304n may not be worn properly if the seatbelt is not buckled. In another example, the seatbelts 304a-304n may not be worn properly if the seatbelt is tucked under the arm and/or behind the occupant. If the seatbelt is worn properly, the method 650 may return to the step 654. If the seatbelt is not worn properly, the method 650 may move to the step 664.

In the step 664, the decision module 158 may select the appropriate reaction (e.g., to encourage proper seatbelt usage). Next, in the step 666, the processors 106a-106n may generate the signal VCTRL to initiate the selected reaction. For example, the signal VCTRL may be configured to cause the actuators 116 to perform the selected reaction. Next, the method 650 may move to the step 668. The step 668 may end the method 650.

Figure 12:
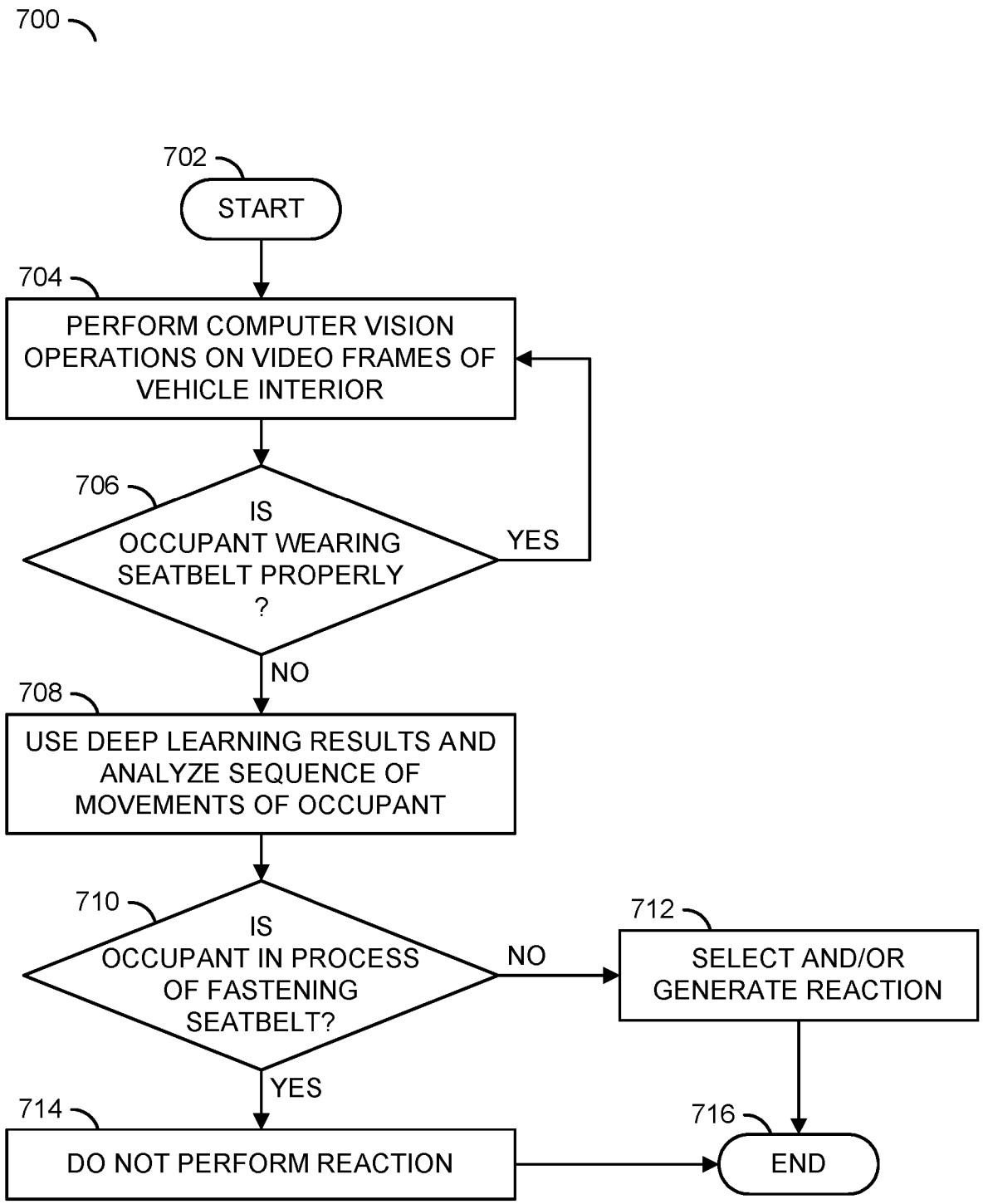
FIG. 12 is a flow diagram illustrating a method for selecting a reaction in response to a pattern of movements of an occupant.

Referring to FIG. 12, a method (or process) 700 is shown. The method 700 may select a reaction in response to a pattern of movements of an occupant. The method 700 generally comprises a step (or state) 702, a step (or state) 704, a decision step (or state) 706, a step (or state) 708, a decision step (or state) 710, a step (or state) 712, a step (or state) 714, and a step (or state) 716.

The step 702 may start the method 700. In the step 704, the CNN module 150 may perform the computer vision operations on the video frames of the interior of the vehicle 50. Next, the method 700 may move to the decision step 706.

In the decision step 706, the processors 106a-106n may determine whether the occupants 452a-452n are wearing the respective seatbelts 304a-304n properly. If the occupants 452a-452n are wearing the seatbelts 304a-304n properly, the method 700 may return to the step 704. If one of the occupants 452a-452n is not wearing the respective seatbelts 304a-304n properly, the method 700 may move to the step 708. In the step 708 the CNN module 150 may use deep learning results and analyze the sequence of movements of the occupant 452'. For example, the sequence of movements may be determined by tracking the object over a sequence of video frames and determining a difference in positions from frame to frame. Next, the method 700 may move to the decision step 710.

In the decision step 710, the processors 106a-106n may determine whether one or more of the occupants 452a-452n (e.g., the occupant 452') are in the process of fastening the respective seatbelts 304a-304n. If the occupant 452' is not in the process of fastening the seatbelt 304, the method 700 may move to the step 712. In the step 712, the decision module 158 may select and/or generate the reaction (e.g., generate the signal VCTRL). Next, the method 700 may move to the step 716.

In the decision step 710, if the occupant 452' is in the process of fastening the seatbelt 304 then the method 700 may move to the step 714. In the step 714, the processors 106a-106n may not perform the reaction. In some embodiments, the processors 106a-106n may delay the reaction until a confirmation is made that the sequence of movements performed by the occupant 452' may remedy the improper use of the seatbelt 304 (e.g., a sufficient confidence level is achieved based on the sequence of movements from frame to frame). Next, the method 700 may move to the step 716. The step 716 may end the method 700.

Generally, the processors 106a-106n may continually monitor the occupants and/or the status of the seatbelts. When the status of the seatbelts is detected as improper and/or changes from being proper to improper (e.g., the occupant 452 unbuckles the seatbelt) the processors 106a-106n may select the appropriate reaction. The reaction may be delayed while the processors 106a-106n analyze the sequence of video frames to determine the pattern of movements. If the pattern of movements corresponds to correcting the improper usage of the seatbelt then the reaction may not be initiated.

Figure 13:
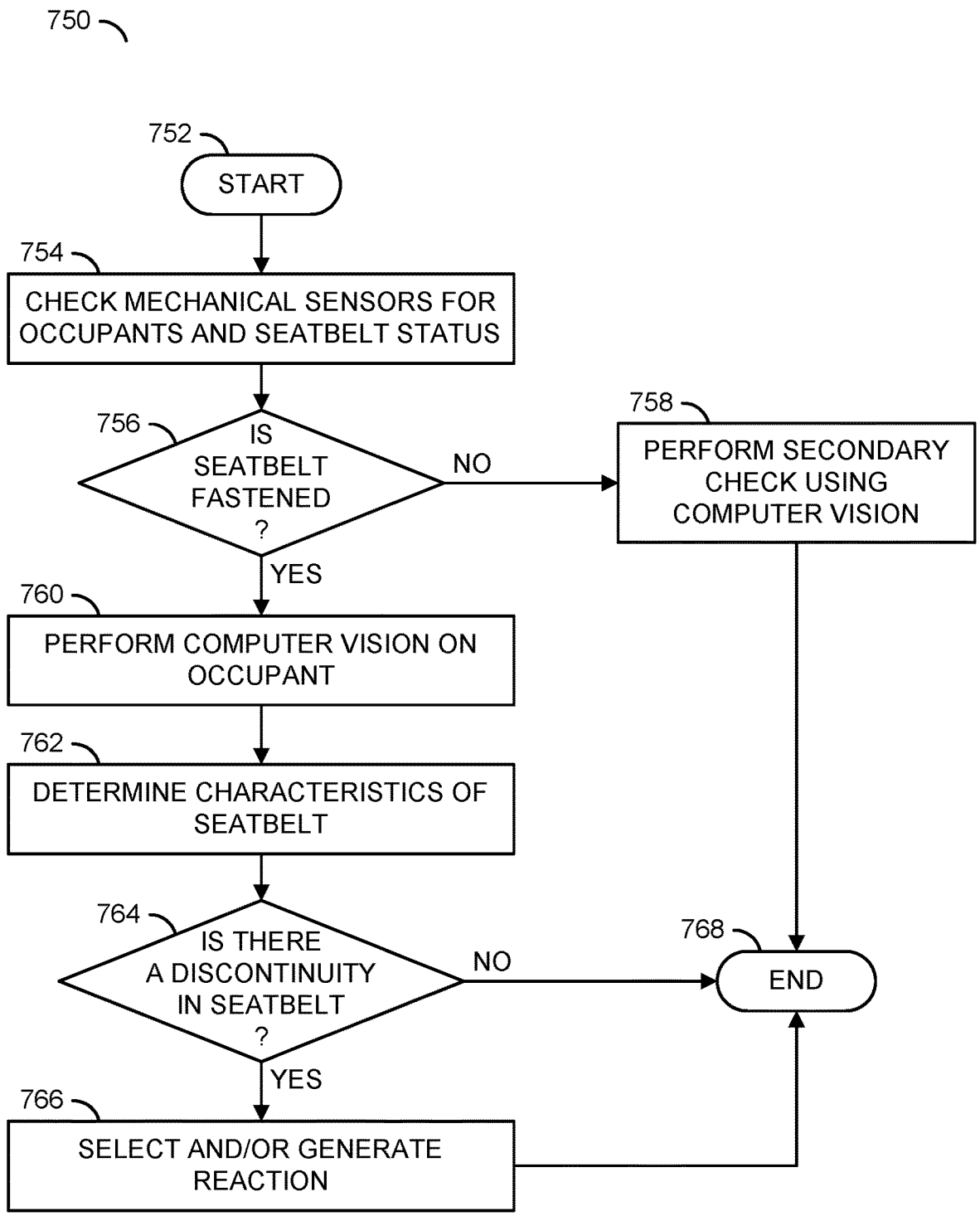
FIG. 13 is a flow diagram illustrating a method for determining a state of a seatbelt using sensor fusion.

Referring to FIG. 13, a method (or process) 750 is shown. The method 750 may determine a state of a seatbelt using sensor fusion. The method 750 generally comprises a step (or state) 752, a step (or state) 754, a decision step (or state) 756, a step (or state) 758, a step (or state) 760, a step (or state) 762, a decision step (or state) 764, a step (or state) 766, and a step (or state) 768.

The step 752 may start the method 750. In the step 754, the processors 106a-106n may check the mechanical vehicle sensors 114 (e.g., the pressure sensors 502a-502b, the seatbelt connector 506, etc.) to determine whether there may be occupants present and/or the seatbelt status. For example, the sensors 114 may present the signal SEN to the interface 104 and the processors 106a-106n may receive the signal DATA to read information captured by the sensors 114. Next, the method 750 may move to the decision step 756.

In the decisions step 756, the processors 106a-106n may determine whether the seatbelts 304a-304n are fastened. For example, the processors 106a-106n may make a preliminary decision about the seatbelts 304a-304n based on the vehicle sensors 114. If an occupant is present and the seatbelt is not fastened, the method 750 may move to the step 758. In the step 758, the processors 106a-106n may perform a secondary check of the status of the seatbelts and/or whether an occupant is present using the computer vision operations (e.g., as described in association with FIG. 11). Next, the method 750 may move to the step 768.

In the decision step 756, if the seatbelt is fastened the method 750 may move to the step 760. In the step 760, the CNN module 150 may perform the computer vision operations on the occupants 452a-452n. Next, in the step 762, the processors 106a-106n may determine the characteristics of the seatbelts 304a-304n. For example, the processors 106a-106n may check for specific markers (e.g., how the seatbelt fits on the occupant, the condition of the seatbelt, if there is a discontinuity, if the seatbelt 304 is connected to the connector 506, etc.) to determine whether the seatbelt is worn properly. Next, the method 750 may move to the decision step 764.

In the decision step 764, the processors 106a-106n may determine whether there is a discontinuity in the seatbelts 304a-304n. For example, the computer vision operations may be performed to detect the discontinuity 620 shown in association with FIG. 10. If there is no discontinuity 620 in the seatbelts 304a-304n, then the method 750 may move to the step 768 (e.g., the seatbelt may be worn properly and no reaction may be selected). If there is the discontinuity 620, then the method 750 may move to the step 766. In the step 766, the decision module 158 may select the appropriate reaction (e.g., an audio message) and/or the processors 106a-106n may generate the reaction (e.g., the signal VCTRL). Next, the method 750 may move to the step 768. The step 768 may end the method 750.

Figure 14:
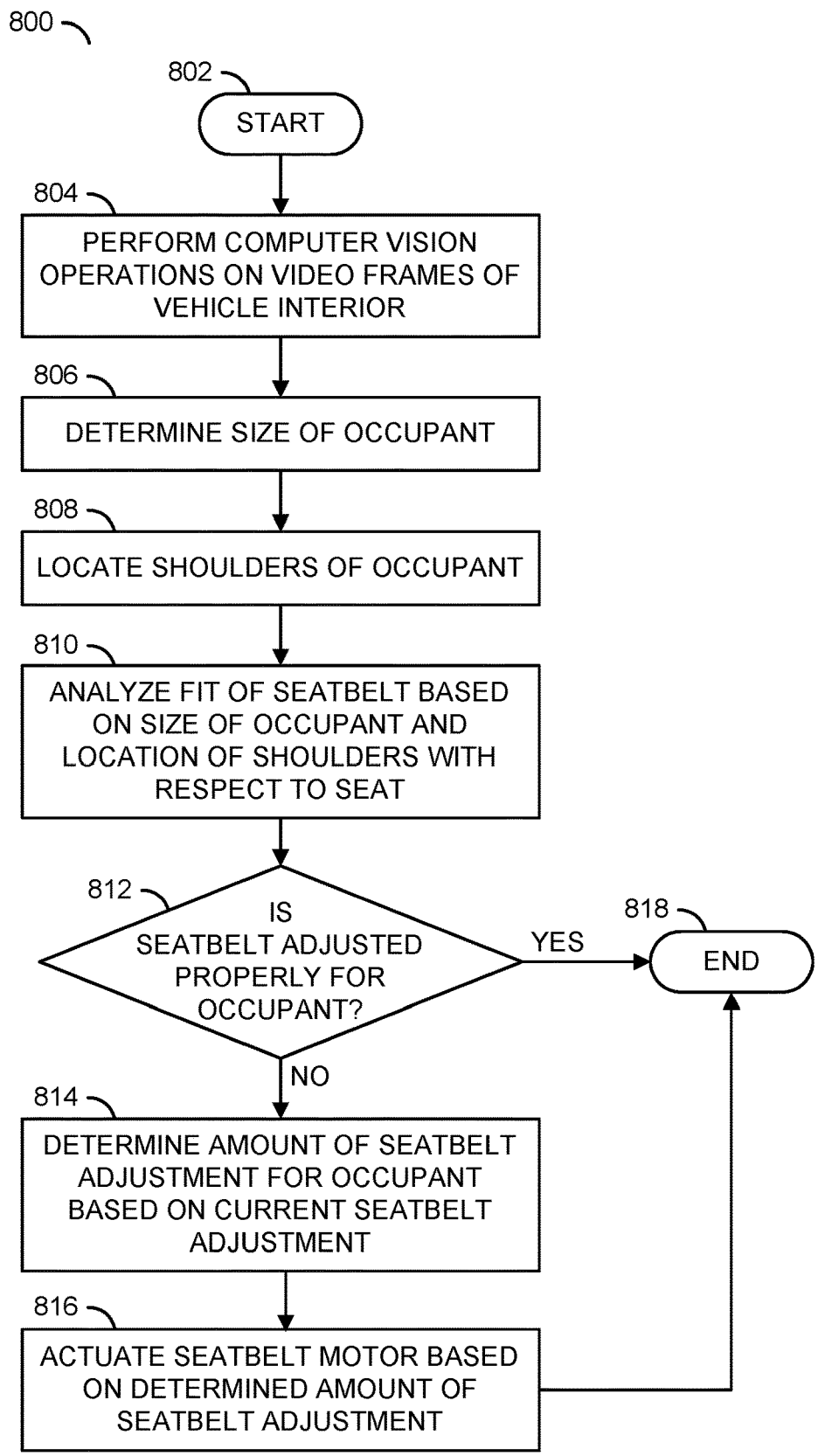
FIG. 14 is a flow diagram illustrating a method for adjusting a seatbelt based on characteristics of an occupant.

Referring to FIG. 14, a method (or process) 800 is shown. The method 800 may adjust a seatbelt based on characteristics of an occupant. The method 800 generally comprises a step (or state) 802, a step (or state) 804, a step (or state) 806, a step (or state) 808, a step (or state) 810, a decision step (or state) 812, a step (or state) 814, a step (or state) 816, and a step (or state) 818.

The step 802 may start the method 800. In the step 804, the CNN module 150 may perform the computer vision operations on the video frames of the interior of the vehicle 50. Next, in the step 806, the processors 106a-106n may determine the size of the occupants 452a-452n. In some embodiments, the size of the occupants 452a-452n may be determined by detecting particular body parts (e.g., the head of the occupants 452a-452n) with respect to the size of the seats 502a-502n. Next, in the step 808, the CNN module 150 and/or the processors 106a-106n may locate the shoulders 610a-610b of the occupants 452a-452n. In some embodiments, the shoulders 610a-610b may be one of the body parts of the occupants 452a-452n detected by the processors 106a-106n to determine the size of the occupants 452a-452n (e.g., the shoulders 610a-610b may be located before determining the size of the occupants 452a-452n). In the step 810, the processors 106a-106n may analyze the fit of the seatbelts 304a-304n based on the size of the occupant 452a-452n and/or the location of the shoulders 610a-610b with respect to the seats 502a-502n (e.g., the seats 502a-502n may be objects having a fixed size that may be used as a reference to compare with the size of the occupants 452a-452n). Next, the method 800 may move to the decision step 812.

In the decision step 812, the processors 106a-106n and/or the decision module 158 may determine whether the seatbelts 304a-304n is adjusted properly for the respective occupants 452a-452n. For example, the proper fit may be determined based on the size of the occupants 452a-452n and/or the location of the shoulders 610a-610b. If the seatbelt 304a-304n are adjusted properly, then the method 800 may move to the step 818 (e.g., no reaction is selected). If the seatbelts 304a-304n are not adjusted properly, then the method 800 may move to the step 814.

In the step 814, the processors 106a-106n may determine the amount of seatbelt adjustment for the occupants 452a-452n based on the current seatbelt adjustment. For example, the current seatbelt adjustment may be determined by one of the vehicle sensors 114 (e.g., a mechanical sensor) implemented in the shoulder hinge 602. In another example, the current seatbelt adjustment may be determined using the computer vision operations. Next, in the step 816, the processors 106a-106n may actuate (e.g., generate the signal VCTRL) the seatbelt motor 604 based on the determined amount of seatbelt adjustment. Next, the method 800 may move to the step 818. The step 818 may end the method 800.

The processors 106a-106n may be configured to encourage proper usage of the seatbelts 304a-304n. Encouraging proper usage of the seatbelts 304a-304n may be performed for the safety of the occupants 452a-452n. The proper usage of the seatbelts 304a-304n may comprise various safety characteristics to enable the seatbelts 304a-304n to protect the occupants 452a-452n. For example, the proper usage may comprise wearing the seatbelts 304a-304n, securing the occupants with the seatbelts 304a-304n, ensuring the seatbelts 304a-304n are worn according to guidelines, regulations, and/or safety recommendations, adjusting the seatbelts 304a-304n so that the fit corresponds to the size of the occupants 452a-452n, the type of vehicle 50 (e.g., a racing vehicle may have different seatbelt considerations than a passenger car), etc. Proper usage of the seatbelts 304a-304n may change over time as rules and regulations evolve and/or as safety research uncovers new information. The decision module 158 may be updated with new information about proper seatbelt usage. The proper seatbelt usage may be varied according to the design criteria of a particular implementation.

Encouraging the proper usage of the seatbelts 304a-304n may be implemented to guide the occupants 452a-452n towards following various guidelines for the proper usage of the seatbelts 304a-304n. In some embodiments, encouraging the proper usage of the seatbelts 304a-304n may provide an incentive to comply with the proper usage of the seatbelts 304a-304n guidelines. The occupants of the vehicle 50 may be encouraged in various ways. For example, an audio tone may provide an annoyance that may encourage the occupant to buckle the seatbelt. In another example, automatically adjusting the fit of the seatbelt may be performed to encourage the proper usage of the seatbelts 304a-304n.

Automatic adjustments to the seatbelts 304a-304n may not be practical in some circumstances. For example, automatically connecting the seatbelt 304 while the driver 202 is operating the vehicle 50 may be dangerous (e.g., could interfere with steering). Therefore various reactions may be available (e.g., audio tones, warning lights, messages displayed on an infotainment system, etc.). In some embodiments, the processors 106a-106n may be configured to record information about the seatbelt usage. For example, a data log of improper seatbelt usage may encourage the proper seatbelt usage (e.g., parents of young drivers may review the data logs, the data logs may be provided to insurance companies and/or law enforcement, etc.). The types of encouragement for guiding the occupants to use the seatbelts properly may be varied according to the design criteria of a particular implementation.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data corresponding to an interior view of a vehicle; and
a processor configured to
(i) generate video frames from said pixel data,
(ii) perform computer vision operations to detect objects in said video frames,
(iii) detect (a) occupants of said vehicle, (b) seats of said vehicle, and (c) a status of a seatbelt for each of said occupants, each based on said objects detected in said video frames, and
(iv) select a reaction based on (a) said status of said seatbelt and (b) characteristics of said occupants, wherein (a) said characteristics are determined by performing said computer vision operations on each of said occupants, (b) said status of said seatbelt is determined in response to a relationship between said characteristics of said occupants relative to said seats, (c) said computer vision operations detect said objects by performing feature extraction based on neural network weight values for each of a plurality of visual features that are associated with said objects extracted from said video frames and (d) said neural network weight values are determined in response to an analysis of training data by said processor prior to said feature extraction.

2. The apparatus according to claim 1, wherein said reaction implements an automatic adjustment of said seatbelt based on said characteristics of said occupants determined using said computer vision operations.

3. The apparatus according to claim 2, wherein (i) said processor is configured to generate a signal to activate a motor and (ii) said motor is configured to perform said reaction by adjusting a shoulder hinge of said seatbelt.

4. The apparatus according to claim 1, wherein said computer vision operations are implemented by a convolutional neural network.

5. The apparatus according to claim 4, wherein said convolutional neural network is trained using fleet learning.

6. The apparatus according to claim 5, wherein (i) said fleet learning comprises capturing reference images using a capture device in a vehicle production facility, (ii) said reference images comprise an unoccupied interior of a vehicle, (iii) said reference images are used as said training data for said convolutional neural network and (iv) said training data comprises said reference images from many different vehicles.

7. The apparatus according to claim 6, wherein (i) said training data is uploaded to a central source for training said convolutional neural network and (ii) results of said training are installed on said processor.

8. The apparatus according to claim 1, wherein said reaction comprises an audible warning.

9. The apparatus according to claim 1, wherein said characteristics comprise a location of shoulders of said occupants.

10. The apparatus according to claim 1, wherein said characteristics comprise a size of said occupants.

11. The apparatus according to claim 1, wherein said status of said seatbelt comprises whether said seatbelt is properly worn by said occupants.

12. The apparatus according to claim 1, wherein said computer vision operations are configured to detect a sequence of movements by said occupants.

13. The apparatus according to claim 12, wherein said reaction is not performed when said sequence of movements is determined to be a person fastening said seatbelt.

14. The apparatus according to claim 1, wherein said processor has a plurality of co-processors.

15. The apparatus according to claim 1, wherein (i) a capture device configured to generate said pixel data comprises a stereo camera pair and (ii) said computer vision operations comprise performing stereo vision to determine depth information based on said video frames captured by said stereo camera pair.

16. The apparatus according to claim 1, wherein said computer vision operations are further performed by (i) applying a feature detection window to each of a plurality of layers extracted from said video frames and (ii) a convolution operation using matrix multiplication of said plurality of layers defined by said feature detection window.

17. The apparatus according to claim 16, wherein said computer vision operations are further performed by sliding said feature detection window along each of said plurality of layers.

18. The apparatus according to claim 1, wherein (i) said reaction is selected to encourage proper usage of said seatbelt based on said characteristics of said occupants and (ii) said proper usage of said seatbelt comprises determining whether said characteristics of said occupants and said status of said seatbelt comply with regulations.

19. The apparatus according to claim 1, wherein said relationship between said characteristics of said occupants relative to said seats is determined in response to using said computer vision operations to identify body parts of said occupants and measure a distance between said body parts to determine a size of said occupants relative to said seats.

20. An apparatus comprising:
an interface configured to receive pixel data corresponding to an interior view of a vehicle; and
a processor configured to
(i) generate video frames from said pixel data,
(ii) perform computer vision operations to detect objects in said video frames,
(iii) detect (a) occupants of said vehicle, (b) seats of said vehicle, and (c) a status of a seatbelt for each of said occupants, each based on said objects detected in said video frames, and
(iv) select a reaction based on said status of said seatbelt, wherein (a) said computer vision operations detect said objects by performing feature extraction based on neural network weight values for each of a plurality of visual features that are associated with said objects extracted from said video frames and (b) said neural network weight values are determined in response to an analysis of training data by said processor prior to said feature extraction.

* * * * *